(12) United States Patent
Zhamu et al.

(10) Patent No.: US 10,158,121 B2
(45) Date of Patent: *Dec. 18, 2018

(54) FLEXIBLE AND SHAPE-CONFORMAL CABLE-SHAPE ALKALI METAL-SULFUR BATTERIES

(71) Applicant: Nanotek Instruments, Inc., Dayton, OH (US)

(72) Inventors: Aruna Zhamu, Springboro, OH (US); Hui He, Dayton, OH (US); Baofei Pan, Dayton, OH (US); Yu-Sheng Su, Dayton, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/391,368

(22) Filed: Dec. 27, 2016

(65) Prior Publication Data

US 2018/0183024 A1 Jun. 28, 2018

(51) Int. Cl.
*H01M 2/10* (2006.01)
*H01M 4/66* (2006.01)
*H01M 10/0525* (2010.01)
*H01M 10/054* (2010.01)
*H01M 10/04* (2006.01)
(Continued)

(52) U.S. Cl.
CPC .......... *H01M 4/663* (2013.01); *C01B 32/184* (2017.08); *H01M 4/13* (2013.01); *H01M 4/5815* (2013.01); *H01M 4/75* (2013.01); *H01M 10/054* (2013.01); *H01M 10/058* (2013.01); *H01M 10/0525* (2013.01); *H01M 4/134* (2013.01); *H01M 4/136* (2013.01); *H01M 4/38* (2013.01); *H01M 4/386* (2013.01); *H01M 4/5835* (2013.01); *H01M 4/625* (2013.01); *H01M 10/0422* (2013.01); *H01M 2250/20* (2013.01)

(58) Field of Classification Search
CPC .. H01M 2/1055; H01M 2/1083; H01M 4/663; H01M 10/0525; H01M 10/0422; H01M 10/054; H01M 10/0587
See application file for complete search history.

(56) References Cited

U.S. PATENT DOCUMENTS 4,522,897 A 6/1985 Walsh
7,759,008 B2 7/2010 Barker et al.
(Continued)

OTHER PUBLICATIONS

PCT/US17/67065 International Search Report and Written Opinion dated Mar. 9, 2018, 14 pages.
(Continued)

*Primary Examiner* — Brittany L Raymond

(57) ABSTRACT

Provided is a cable-shaped alkali metal-sulfur battery comprising: (a) a first electrode comprising an electrically conductive porous rod and a first mixture of a first electrode active material and a first electrolyte residing in pores of the porous rod; (b) a porous separator wrapping around the first electrode; (c) a second electrode comprising an electrically conductive porous layer wrapping around or encasing the separator, wherein the porous layer contains a second mixture of a second electrode active material and a second electrolyte residing in pores of the porous layer; and (d) a protective sheath encasing the second electrode; wherein one electrode is a cathode containing sulfur, a sulfur-carbon compound, sulfur-polymer composite, or metal sulfide.

39 Claims, 16 Drawing Sheets

(51) Int. Cl.
    *H01M 10/0587*     (2010.01)
    *H01M 4/13*     (2010.01)
    *H01M 4/58*     (2010.01)
    *H01M 4/75*     (2006.01)
    *H01M 10/058*     (2010.01)
    *C01B 32/184*     (2017.01)
    *H01M 4/134*     (2010.01)
    *H01M 4/136*     (2010.01)
    *H01M 4/38*     (2006.01)
    *H01M 4/583*     (2010.01)
    *H01M 4/62*     (2006.01)

(56) References Cited

U.S. PATENT DOCUMENTS

| | | |
|---|---|---|
| 2005/0271574 A1 | 12/2005 | Jang et al. |
| 2009/0059474 A1 | 3/2009 | Zhamu et al. |
| 2009/0061312 A1 | 3/2009 | Zhamu et al. |
| 2010/0021819 A1 | 1/2010 | Zhamu et al. |
| 2010/0222482 A1 | 9/2010 | Jang et al. |
| 2012/0009331 A1 | 1/2012 | Kwon et al. |
| 2012/0015233 A1 | 1/2012 | Kwon et al. |
| 2012/0015239 A1 | 1/2012 | Kwon et al. |
| 2014/0098461 A1 | 4/2014 | Zhamu et al. |

OTHER PUBLICATIONS

Chen, Z. et al. "Three-dimensional flexible and conductive interconnected graphene networks grown by chemical vapor deposition," Nature Materials, 10, 424-428 (2011).

---------- scale = 500 nm

Metal grid;  scale = 200 μm

Carbon nano-fiber mat; fiber diameter = 150 nm

Graphene foam; ____ 100 μm

Carbon foam

Graphite foam

Ni foam

Cu foam

Stainless steel foam

FLEXIBLE AND SHAPE-CONFORMAL CABLE-SHAPE ALKALI METAL-SULFUR BATTERIES

FIELD OF THE INVENTION

This invention is directed at a secondary (rechargeable) lithium-sulfur battery (including Li—S and Li ion-S cells), sodium-sulfur battery (including Na—S and Na ion-S cells), or their combination or hybrid cell that is flexible, conformal, and non-flammable.

BACKGROUND OF THE INVENTION

Conventional batteries (e.g. 18650-type cylindrical cells and rectangular pouch or prismatic cells) are mechanically rigid and this non-flexibility feature has severely constrained its adaptability or feasibility of being implemented in confined spaces or for use in wearable devices. Flexible and shape-conformable power sources can be used to overcome these design limitations. These new power sources will enable the development of next-generation electronic devices, such as smart mobile gadgets, roll-up displays, wearable devices, and biomedical sensors. Flexible and conformable power sources will also save weight and space in electric vehicles.

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-250 Wh/kg, most typically 150-220 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8 + 16Li \leftrightarrow 8Li_2S$ that lies near 2.2 V with respect to $Li^+/Li^\circ$. This electrochemical potential is approximately ⅔ of that exhibited by conventional positive electrodes (e.g. $LiMnO_4$) in a conventional lithium-ion battery. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/L, respectively, based on the combined Li and S weight or volume. If based on the total cell weight or volume, the energy densities can reach approximately 1,000 Wh/kg and 1,300 Wh/L, respectively. However, the current Li-sulfur cells reported by industry leaders in sulfur cathode technology have a maximum cell specific energy of 250-400 Wh/kg and 350-550 Wh/L (based on the total cell weight or volume), which are far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit a rapid and significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.
(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

Despite the various approaches proposed for the fabrication of high energy density Li—S cells, there remains a need for cathode materials and production processes that improve the utilization of electro-active cathode materials (S utilization efficiency), and provide rechargeable Li—S cells with high capacities over a large number of cycles. Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

Low-capacity anode or cathode active materials are not the only problem associated with the lithium-sulfur or sodium-sulfur battery. There are serious design and manufacturing issues that the battery industry does not seem to be aware of, or has largely ignored. For instance, despite the seemingly high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 mg/cm$^2$ and mostly <8 mg/cm$^2$ (areal density=the amount of active materials per electrode cross-sectional area along the electrode thickness direction). The cathode active material amount is typically 1.5-2.5 times higher than the anode active material amount in a cell. As a result, the weight proportion of the anode active material (e.g. carbon) in a Na ion-sulfur or Li ion-sulfur battery cell is typically from 15% to 20%, and that of the cathode active material from 20% to 35% (mostly <30%). The weight fraction of the cathode and anode active materials combined is typically from 35% to 50% of the cell weight.

The low active material mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. Due to the low-melting and soft characteristics of sulfur, it has been practically impossible to produce a sulfur cathode thicker than 100 μm. Furthermore, in a real battery manufacturing facility, a coated electrode thicker than 150 μm would require a heating zone as long as 100 meters to thoroughly dry the coated slurry. This would significantly increase the equipment cost and reduce the production throughput. The low areal densities and low volume densities (related to thin electrodes and poor packing density) result in a relatively low volumetric capacity and low volumetric energy density of the battery cells.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities.

Thus, an object of the present invention is to provide a rechargeable alkali metal-sulfur cell based on rational materials and battery designs that overcome or significantly reduce the following issues commonly associated with conventional Li—S and Na—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides; (c) dissolution of S and alkali metal polysulfide in electrolyte and migration of polysulfides from the cathode to the anode (which irreversibly react with Li or Na metal at the anode), resulting in active material loss and capacity decay (the shuttle effect); (d) short cycle life; and (e) low active mass loading in both the anode and the cathode.

A specific object of the present invention is to provide a rechargeable alkali metal-sulfur battery (e.g. mainly Li—S and room temperature Na—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, more preferably greater than 600 Wh/Kg, and most preferably greater than 700 Wh/kg (all based on the total cell weight). Preferably, the volumetric energy density is greater than 600 Wh/L, further preferably greater than 800 Wh/L, and most preferably greater than 1,000 Wh/L.

Another object of the present invention is to provide an alkali metal-sulfur cell that exhibits a high cathode specific capacity, higher than 1,200 mAh/g based on the sulfur weight, or higher than 1,000 mAh/g based on the cathode composite weight (including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

Additionally, thick electrodes are also mechanically rigid, not flexible, not bendable, and not conformal to a desired shape. As such, for conventional alkali metal batteries, high volumetric/gravimetric energy density and mechanical flexibility appear to be mutually exclusive.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities for alkali metal batteries.

Therefore, there is clear and urgent need for alkali metal-sulfur batteries that have high active material mass loading (high areal density), active materials with high apparent density (high tap density), high electrode thickness without significantly decreasing the electron and ion transport rates (e.g. without a high electron transport resistance or long lithium or sodium ion diffusion path), high volumetric capacity, and high volumetric energy density.

These attributes must be achieved, along with flexibility, shape conformability, and safety of the resulting battery.

SUMMARY OF THE INVENTION

The present invention provides a cable-shaped alkali metal-sulfur battery wherein the alkali metal is selected from Li, Na, or a combination thereof. The battery has a cable shape having a length-to-diameter or length-to-thickness aspect ratio no less than 5, preferably no less than 10, more preferably greater than 15, further more preferably greater than 20, still more preferably greater than 50. There is no theoretical limit on the aspect ratio. However, the cable length can be miles long and, with a cable diameter of 5 mm and a length of >10 km, a practical aspect ratio limit may be >$10^6$.

The battery comprises: (a) a first electrode comprising an electrically conductive porous rod having pores and a first mixture of a first electrode active material and a first electrolyte, wherein the first mixture resides in the pores of the porous rod; (b) a porous separator wrapping around the first electrode; (c) a second electrode comprising an electrically conductive porous layer wrapping around or encasing the porous separator, wherein the conductive porous layer contains pores and a second mixture of a second electrode active material and a second electrolyte, and the second mixture resides in the pores of the porous layer; and (d) a protective casing or sheath wrapping around or encasing the second electrode to form a cable shape that is flexible and shape-conformal. In this battery structure, either the first electrode or the second electrode is a cathode and either the first electrode active material or the second electrode active material is a cathode active material that contains sulfur or a sulfur compound (e.g. organo-sulfur, polymer-sulfur, carbon-sulfur, metal sulfide, S—Sb, S—Bi, S—Se, S—Te mixture materials, etc.) as a cathode active material. The first electrolyte can be the same or different from the second electrolyte.

In certain preferred embodiments, the cathode active material is selected from (A) sulfur bonded to pore walls of said porous rod or porous layer, (B) sulfur bonded to or confined by a carbon or graphite material, (C) sulfur bonded to or confined by a polymer, (D) sulfur-carbon compound, (E) metal sulfide $M_xS_y$, wherein x is an integer from 1 to 3 and y is an integer from 1 to 10, and M is a metal element selected from Li, Na, K, Mg, Ca, a transition metal, a metal from groups 13 to 17 of the periodic table, or a combination thereof.

In this alkali metal battery, the first electrode is a negative electrode (or anode) and the second electrode is a positive electrode (or cathode). This is a preferred configuration. In some alternative embodiments, the second electrode is a negative electrode or anode and the first electrode is a positive electrode or cathode.

The electrically conductive porous rod in the first electrode or the electrically conductive porous layer in the second electrode may contain a porous foam selected from a metal foam, metal web, metal fiber mat, metal nanowire mat, conductive polymer fiber mat, conductive polymer foam, conductive polymer-coated fiber foam, carbon foam, graphite foam, carbon aerogel, graphene aerogel, carbon xerogel, graphene foam, graphene oxide foam, reduced graphene oxide foam, carbon fiber foam, graphite fiber foam, exfoliated graphite foam, or a combination thereof. These foams can be made into highly deformable and conformable structures. The electrically conductive porous rod or layer may contain a carbon/graphite fiber, fiber tow, fiber yarn, fiber braid, fiber knit structure that is porous.

These foam structures can be readily made into a porosity level>50%, more typically >70%, more typically and preferably >80%, still more typically and preferably >90%, and most preferably >95% (graphene aerogel can exceed a 99% porosity level). The skeleton structure (pore walls) in these foams forms a 3D network of electron-conducting pathways while the pores can accommodate a large proportion of an electrode active material (anode active material in the anode or cathode active material in the cathode) without using any conductive additive or a binder resin.

The foam can have a cross-section that is circular, elliptic, rectangular, square, hexagon, hollow, or irregular in shape. There is no particular restriction on the cross-sectional shape of the foam structure. The battery has a cable shape that has a length and a diameter or thickness and an aspect ratio (length/thickness or length/diameter ratio) greater than 10, preferably greater than 15, more preferably greater than 20, further preferably greater than 30, even more preferably greater than 50 or 100. There is no restriction on the length or diameter (or thickness) of the cable battery. The thickness or diameter is typically and preferably from 100 nm to 10 cm, more preferably and typically from 1 µm to 1 cm, and most typically from 10 µm to 1 mm. The length can run from 1 µm to tens of meters or even hundreds of meters (if so desired).

In certain embodiments, the cable-shaped battery has a first end and a second end and the first electrode contains a first terminal connector comprising at least one metallic wire, conductive carbon/graphite fiber, or conductive polymer fiber that is embedded in, connected to, or integral with the first electrode. In certain preferred embodiments, the at least one metallic wire, conductive carbon/graphite fiber, or conductive polymer fiber runs approximately from the first end to the second end. This wire or fiber preferably is protruded out of the first end or second end to become a terminal tab for connecting to an electronic device or external circuit or load.

Alternatively or additionally, the cable-shaped battery has a first end and a second end and the second electrode contains a second terminal connector comprising at least one metallic wire, conductive carbon/graphite fiber, or conductive polymer fiber that is embedded in, connected to, or integral with the second electrode. In certain embodiments, at least one metallic wire, conductive carbon/graphite fiber, or conductive polymer fiber runs approximately from said first end to said second end. This wire or fiber preferably is protruded out of the first end or second end to become a terminal tab for connecting to an electronic device or external circuit or load.

In some embodiments, the first electrode or second electrode contains particles, foil, or coating of Li, Na, K, or a combination thereof as an electrode active material.

In certain embodiments of the invention, the alkali metal battery is a lithium-ion battery and the first or second electrode active material is selected from the group consisting of: (a) Particles of natural graphite, artificial graphite, meso-carbon microbeads (MCMB), and carbon; (b) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) Alloys or intermetallic compounds of Si, Ge, Sn, Pb, Sb, Bi, Zn, Al, or Cd with other elements, wherein said alloys or compounds are stoichiometric or non-stoichiometric; (d) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; (e) Pre-lithiated versions thereof; (f) Pre-lithiated graphene sheets; and combinations thereof.

The pre-lithiated graphene sheets may be selected from pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

In some embodiments, the alkali metal-sulfur battery is a sodium-ion sulfur battery and the first or second electrode active material contains an alkali intercalation compound selected from petroleum coke, carbon black, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In some embodiments, the alkali metal-sulfur battery is a sodium-ion sulfur battery and the first or second electrode active material contains an alkali intercalation compound selected from the following groups of materials: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; and (e) Graphene sheets pre-loaded with sodium or potassium on their surfaces; and combinations thereof.

In some preferred embodiment, the second or first electrode active material contains a lithium intercalation compound or lithium absorbing compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, lithium selenide, lithium polysulfide, and combinations thereof.

In certain embodiments, the second or first electrode active material contains a sodium intercalation compound or a potassium intercalation compound selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda$-$MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, $NiHCF$, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein x is from 0.1 to 1.0.

The first electrolyte and/or the second electrolyte may contain a lithium salt or sodium salt dissolved in a liquid solvent and wherein the liquid solvent is water, an organic solvent, an ionic liquid, or a mixture of an organic solvent and an ionic liquid. The liquid solvent may be mixed with a polymer to form a polymer gel.

The first electrolyte and/or second electrolyte preferably contains a lithium salt or sodium salt dissolved in a liquid solvent having a salt concentration greater than 2.5 M (preferably >3.0 M, further preferably >3.5 M, even more preferably >5.0 M, still more preferably >7.0 M, and most preferably >10 M, but typically no greater than 15 M).

In the alkali metal-sulfur battery, the electrically conductive porous rod in the first electrode or the electrically conductive porous layer in the second electrode has at least 90% by volume of pores, the first or second electrode has a diameter or thickness no less than 200 μm or has an active mass loading occupying at least 30% by weight or by volume of the entire battery cell, or the first and second electrode active materials combined occupies at least 50% by weight or by volume of the entire battery cell.

In some preferred embodiments, the electrically conductive porous rod in the first electrode or the electrically conductive porous layer in the second electrode has at least 95% by volume of pores, the first or second electrode has a diameter or thickness no less than 300 μm or has an active mass loading occupying at least 35% by weight or by volume of the entire battery cell, or the first and second electrode active materials combined occupies at least 60% by weight or by volume of the entire battery cell.

DESCRIPTION OF THE PREFERRED EMBODIMENTS

This invention is directed at a flexible and shape-conformable cable-like alkali metal-sulfur battery exhibiting an exceptionally high volumetric energy density and high gravimetric energy density. This does not include the so-called high-temperature Na—S cell that must operate at a temperature higher than the melting point of the electrolyte (typically >350° C.) and higher than the melting point of sulfur. The invented alkali metal-sulfur battery can be a primary battery, but is preferably a secondary battery selected from an alkali metal-ion battery (e.g. using a Li or Na intercalation compound, such as hard carbon particles) or an alkali metal-sulfur secondary battery (e.g. using Na or Li metal foil as an anode active material). The battery is based on an aqueous electrolyte, a non-aqueous or organic electrolyte, a gel electrolyte, an ionic liquid electrolyte, or a mixture of organic and ionic liquid. A polymer can be added to these electrolytes to form a gel. The electrolyte does not include the solid-state electrolyte.

Figure 1A:
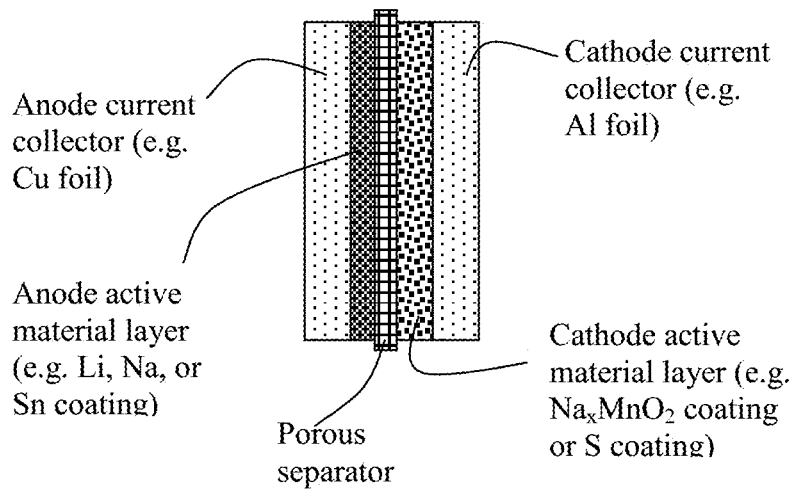
FIG. 1(A) schematic of a prior art lithium-ion battery cell (as an example of an alkali metal battery) composed of an anode current collector, an anode electrode (e.g. thin Si coating layer), a porous separator, a cathode electrode (e.g. sulfur layer), and a cathode current collector.
Figure 1B:
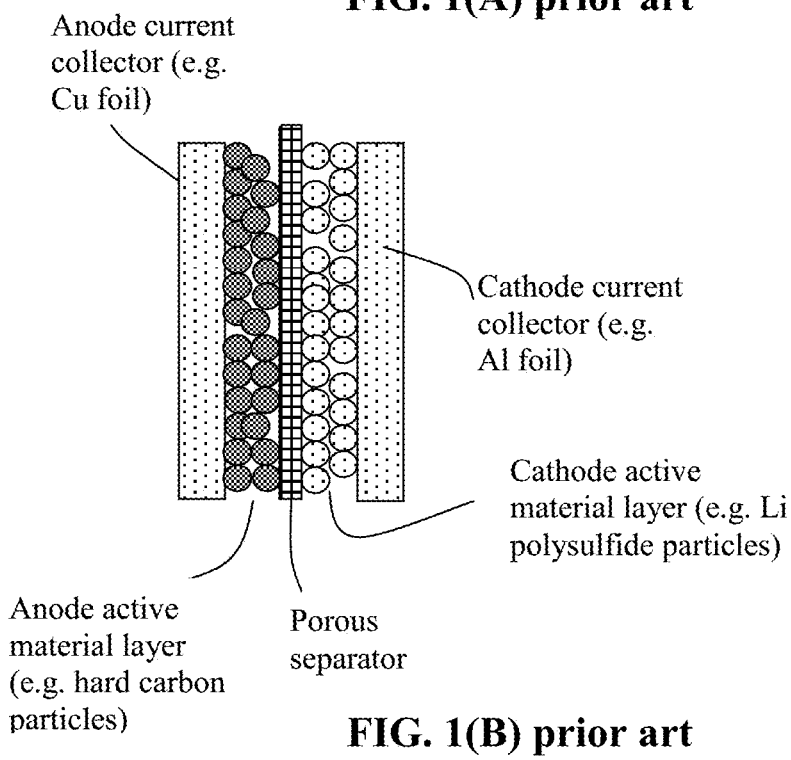
FIG. 1(B) schematic of a prior art lithium-ion battery, wherein the electrode layer is composed of discrete particles of an active material (e.g. graphite or tin oxide particles in the anode layer or $LiCoO_2$ in the cathode layer).

As illustrated in FIG. 1(A) and FIG. 1(B), a conventional lithium-ion, sodium-ion, Li—S, or Na—S battery cell is typically composed of an anode current collector (e.g. Cu foil), an anode electrode (anode active material layer), a porous separator and/or an electrolyte component, a cathode electrode (cathode active material layer), and a cathode current collector (e.g. Al foil). In a more commonly used cell configuration (FIG. 1(B)), the anode layer is composed of particles of an anode active material (e.g. hard carbon particles), a conductive additive (e.g. expanded graphite flakes), and a resin binder (e.g. SBR or PVDF). The cathode layer is composed of particles of a cathode active material (e.g. $NaFePO_4$ particles in a Na-ion cell or S-carbon composite particles in a Li—S cell), a conductive additive (e.g. carbon black particles), and a resin binder (e.g. PVDF). Both the anode and the cathode layers are typically 60-100 μm thick (typically significantly thinner than 200 μm) to give rise to a presumably sufficient amount of current per unit electrode area. Using an active material layer thickness of 100 μm and the solid (Cu or Al foil) current collector layer thickness of 10 μm as examples, the resulting battery configuration has a current collector thickness-to-active material layer thickness ratio of 10/100 or 1/10 for conventional battery cells.

This thickness range of 60-100 μm is considered an industry-accepted constraint under which a battery designer normally works under, based on the current slurry coating process (roll coating of active material-binder-additive mixture slurry). This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <60 μm) does not contain a sufficient amount of an active alkali metal ion storage material (hence, insufficient current output); (c) thicker electrodes are prone to delaminate or crack upon drying or handling after roll-coating of slurry; and (d) thicker coating requires an excessively long heating zone (it is not unusual to have a heating zone longer than 100 meters, making the manufacturing equipment very expensive). This constraint has made it impossible to freely increase the amount of active materials (those responsible for storing Na or Li ions) without increasing the amounts of all non-active materials (e.g. current collectors and separator) in order to obtain a minimum overhead weight and a maximum sodium storage capability and, hence, a maximized energy density (Wk/kg or Wh/L of cell).

In a less commonly used cell configuration, as illustrated in FIG. 1(A), either the anode active material (e.g. $NaTi_2(PO_4)_3$ or Na film) or the cathode active material (e.g. lithium transition metal oxide in a Li-ion cell or sulfur/carbon mixture in a Li—S cell) is deposited in a thin film form directly onto a current collector, such as a sheet of copper foil or Al foil using sputtering. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total Na or Li storage capacity per unit electrode surface area. Such a thin film must have a thickness less than 100 nm to be more resistant to cycling-induced cracking (for the anode) or to facilitate a full utilization of the cathode active material. Such a constraint further diminishes the total Na or Li storage capacity and the sodium or lithium storage capacity per unit electrode surface area. Such a thin-film battery has very limited scope of application.

On the anode side, a sputtered $NaTi_2(PO_4)_3$ layer thicker than 100 nm has been found to exhibit poor cracking resistance during battery charge/discharge cycles. It takes but a few cycles to get fragmented. On the cathode side, a layer of sulfur thicker than 100 nm does not allow lithium or sodium ions to fully penetrate and reach full body of the cathode layer, resulting in a poor cathode active material utilization rate. A desirable electrode thickness is at least 100 μm (not 100 nm), with individual active material particle having a dimension desirably less than 100 nm. Thus, these thin-film electrodes (with a thickness<100 nm) directly deposited on a current collector fall short of the required thickness by three (3) orders of magnitude. As a further problem, all of the cathode active materials are not very conductive to both electrons and sodium/lithium ions. A large layer thickness implies an excessively high internal resistance and a poor active material utilization rate.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electro-chemists alike for more than 30 years, by developing a new process of producing alkali metal-sulfur batteries as herein disclosed.

The prior art sodium or lithium battery cell, including Li—S and room temperature Na—S cell, is typically made by a process that includes the following steps: (a) The first step is mixing particles of the anode active material (e.g. hard carbon particles), a conductive filler (e.g. expanded graphite flakes), a resin binder (e.g. PVDF) in a solvent (e.g. NMP) to form an anode slurry. On a separate basis, particles of the cathode active material (e.g. sodium metal phosphate particles for the Na-ion cell and LFP particles for the Li-ion cell), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a sodium-ion or lithium battery cell.

There are several serious problems associated with the process and the resulting sodium-ion cells and lithium-ion battery cells (or Li—S and Na—S cells):

1) It is very difficult to produce an electrode layer (anode layer or cathode layer) that is thicker than 100 μm, let alone 200 μm. There are several reasons why this is the case. An electrode of 100 μm thickness typically requires a heating zone of 30-100 meters long in a slurry coating facility, which is too time consuming, too energy intensive, and not cost-effective. For some electrode active materials, such as metal oxide particles or sulfur, it has not been possible to produce an electrode of good structural integrity that is thicker than 100 μm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a high energy density. In most cases, the anode active material mass loading of the electrodes (areal density) is significantly lower than 15 mg/cm$^2$ and the apparent volume density or tap density of the active material is typically less than 1.2 g/cm$^3$ even for relatively large particles of graphite. The cathode active material mass loading of the electrodes (areal density) is significantly lower than 10 mg/cm$^2$ for the sulfur cathode. In addition, there are so many other non-active materials (e.g. conductive additive and resin binder) that add additional weights and volumes to the electrode without contributing to the cell capacity. These low areal densities and low volume densities result in a relatively low gravimetric energy density and low volumetric energy density.

3) The conventional process requires dispersing electrode active materials (anode active material and cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte (using a salt dissolved in a solvent different than NMP) into the cell. In actuality, one makes the two electrodes wet, then makes the electrodes dry, and finally makes them wet again. Such a wet-dry-wet process is not a good process at all.

Furthermore, the most commonly used solvent (NMP) is a notoriously undesirable solvent (known to cause birth defect, for instance).

4) Current Li—S and Na—S batteries still suffer from a relatively low gravimetric energy density and low volumetric energy density. Hence, neither the Li—S nor room temperature Na—S battery has made it to the market place.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. carbon particles) in a sodium-ion battery being typically from 15% to 20%, and that of the cathode active material (e.g. sodium transition metal oxide) from 20% to 30%.

The present invention provides a process for producing a non-flammable, flexible, shape-conformable, and non-flammable alkali metal battery cell having a cable shape, high active material mass loading, low overhead weight and volume, high gravimetric energy density, and high volumetric energy density. In addition, the manufacturing costs of the alkali metal batteries produced by the presently invented process are significantly lower than those by conventional processes.

Figure 1C:
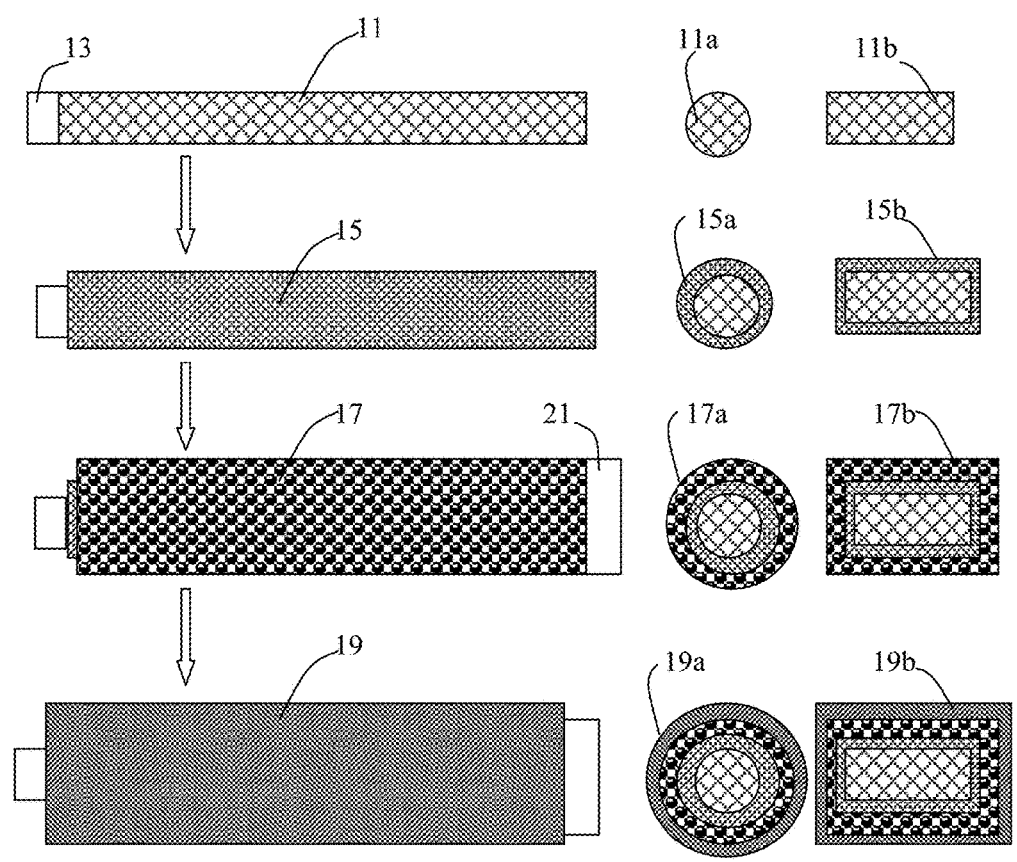
FIG. 1(C) Schematic of a process for producing a cable-shaped flexible and shape-conformable alkali metal-sulfur battery.

In one embodiment of the present invention, as illustrated in FIG. 1(C), the present cable-shaped alkali metal battery can be made by a process that includes a first step of supplying a first electrode 11 composed of an electrically conductive porous rod having pores that are partially or fully loaded with a mixture of a first electrode active material and a first electrolyte. A conductive additive or a resin binder may be optionally added into the mixture, but this is not required or even desired. This first electrode 11 can optionally contain an active material-free and electrolyte-free end section 13 that can serve as a terminal tab for connecting to an external load. This first electrode can assume a cross-section that is of any shape; e.g. circular 11a, rectangular 11b, elliptic, square, hexagonal, hollow, or irregular in shape.

Alternatively, in the first step, the first electrode comprises a conductive rod (not a porous foam) and the first mixture is coated or deposited on the surface of this conductive rod. This rod can be as simple as a metal wire, conductive polymer fiber or yarn, carbon or graphite fiber or yarn, or multiple thin wires, fibers, or yarns. However, in this situation, the second electrode must contain a porous foam structure.

The second step involves wrapping around or encasing the first electrode 11 with a thin layer of porous separator 15 (e.g. porous plastic film, paper, fiber mat, non-woven, glass fiber cloth, etc.) that is permeable to $Li^+$ or $Na^+$ ions, or both. The cross-sectional area of the structure now looks like what is schematically illustrated in 15a, 15b, etc. This step can be as simple as wrapping the first electrode with a thin, porous plastic tape in one full circle or slightly more than one full circle, or in a spiral manner. The main purpose is to electronically separate the anode from the cathode to prevent internal shorting.

The porous layer can be simply obtained depositing a porous material all around the first electrode by spraying, printing, coating, dip casting, etc. For instance, one may dispense a polymer-solvent solution around the substantially dried first electrode, followed by removing the solvent (e.g. water, alcohol, organic solvent, etc.) which leaves behind a thin film containing pores encasing the first electrode to obtain a separator-protected structure. Alternatively, one may simply deposit glass fibers or polymer fibers to form a thin fiber mat layer around the first electrode to obtain a separator-protected structure.

This separator covering or wrapping step is followed by a third step that involves wrapping around or encasing the separator-protected structure with a layer of the second electrode 17. The second electrode 17 comprises a mixture of a second active material and second electrolyte and, optionally, a conductive additive or resin binder (although not necessary and not desirable). This second electrode 17 can optionally contain an active material-free and electrolyte-free end section 21 that can serve as a terminal tab for connecting to an external load. The cross-sectional area of the structure now looks like what is schematically illustrated in 17a, 17b, etc. If the first electrode active material is an anode active material, then the second electrode active material is a cathode active material. If the first electrode active material is a cathode active material, then the second electrode active material is an anode active material.

As the fourth step, this structure is then encased or protected by a cable sheath 19 that is electrically insulating (e.g. a plastic sheath or rubbery shell). The cross-sectional area of the resulting cable battery structure now looks like what is schematically illustrated in 19a, 19b, etc., prior to being connected to an external load (e.g. a bulb, a LED light, an electronic device).

Alternatively, the second electrode comprises a layer of Li and/or Na K metal disposed between the separator layer and the cable sheath or a layer of current collector (e.g. metal foil, such as Cu foil, Ni foil, stainless steel foil, or carbon cloth) deposited with Li and/or Na metal. In this case, however, the first electrode must contain a conductive porous foam structure.

Figure 1D:
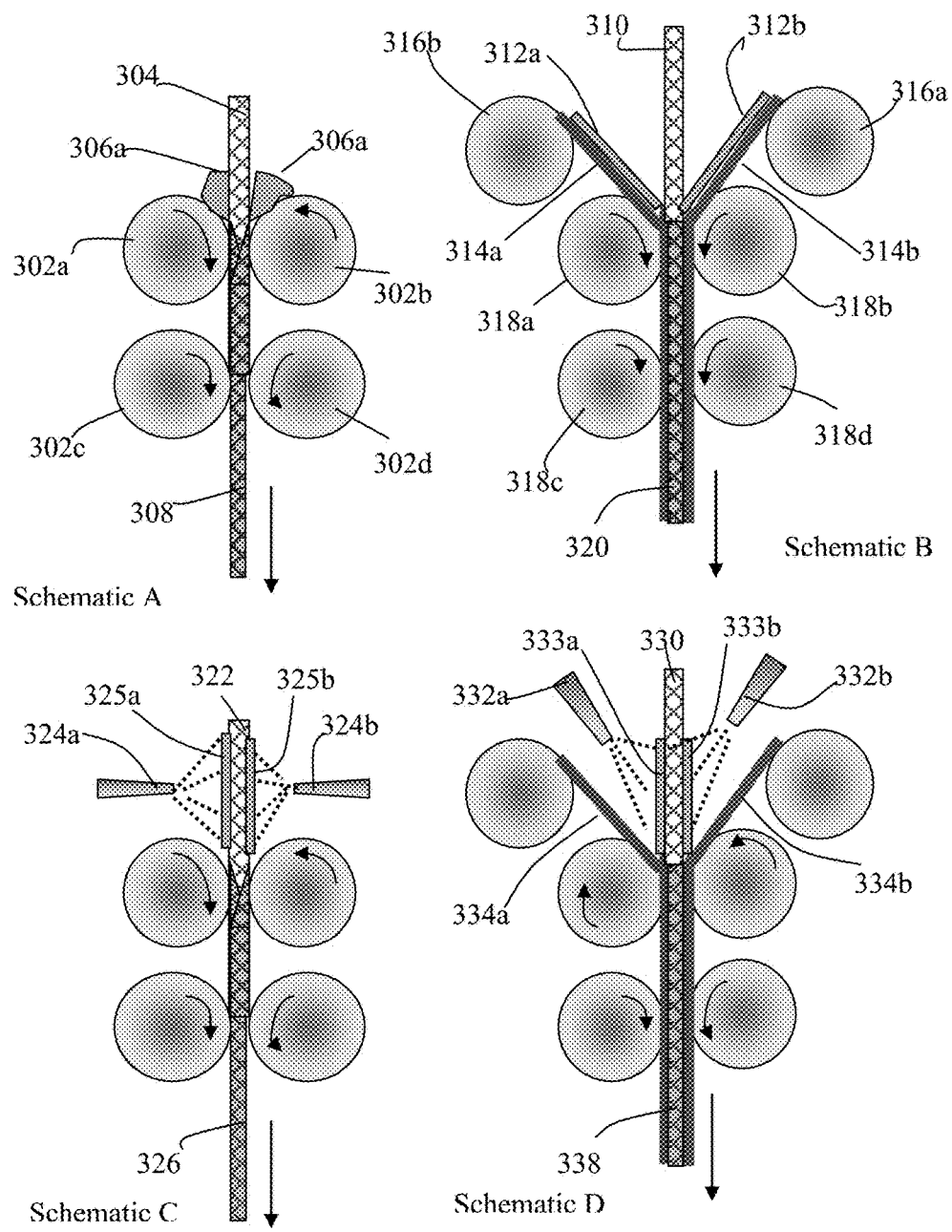
FIG. 1(D) Four examples of the procedure for producing an electrode (anode or cathode) in a continuous and automated manner.

There are several means of making the first electrode or the second electrode. As schematically illustrated in FIG. 1(D) and using a square or rectangular foam layer cross-section as an example, one preferred method comprises continuously feeding one or a plural of electrically conductive porous foam layer (e.g. 304, 310, 322, or 330; only one foam layer being shown, but there can be multiple layers in each case), from a feeder roller (not shown), into an active material/electrolyte impregnation zone where a wet active material mixture (e.g. slurry, suspension, or gel-like mass, such as 306a, 306b, 312a, 312b) of an electrode active material, an electrolyte and an optional conductive additive is delivered to at least a porous surface of the porous layer (e.g. 304 or 310 in Schematic A and schematic B, respectively, of FIG. 1(D)). Using Schematic A as an example, the wet active material/electrolyte mixture (306a, 306b) is forced to impregnate into the porous layer from both sides using one or two pairs of rollers (302a, 302b, 302c, and 302d) to form an impregnated active electrode 308 (an anode or cathode). The conductive porous foam layer contains interconnected network of electron-conducting pathways and at least 50% by volume of pores (preferably >70%, more preferably >80%, further preferably >90%, and most preferably >95%).

In Schematic B, two feeder rollers 316a, 316b are used to continuously pay out two protective films 314a, 314b that support wet active material/electrolyte mixture layers 312a, 312b. These wet active material/electrolyte mixture layers 312a, 312b can be delivered to the protective (supporting)

films 314a, 314b using a broad array of procedures (e.g. printing, spraying, casting, coating, etc., which are well known in the art). As the conductive porous foam layer 110 moves though the gaps between two sets of rollers (318a, 318b, 318c, 318d), the wet active mixture material/electrolyte is impregnated into the pores of the porous layer 310 to form an active material electrode 320 (an anode or cathode electrode layer) covered by two protective films 314a, 314b. These protective films can be later removed.

Using Schematic C as another example, two spraying devices 324a, 324b were used to dispense the wet active material/electrolyte mixture (325a, 325b) to the two opposed porous surfaces of the conductive porous layer 322. The wet active material mixture is forced to impregnate into the porous layer from both sides using one or two pairs of rollers to form an impregnated active electrode 326 (an anode or cathode). Similarly, in Schematic D, two spraying devices 332a, 332b were used to dispense the wet active material mixture (333a, 333b) to the two opposed porous foam layer surfaces of the conductive porous layer 330. The wet active material-electrolyte mixture is forced to impregnate into the porous layer from both sides using one or two pairs of rollers to form an impregnated active electrode 338 (an anode or cathode).

Figure 1E:
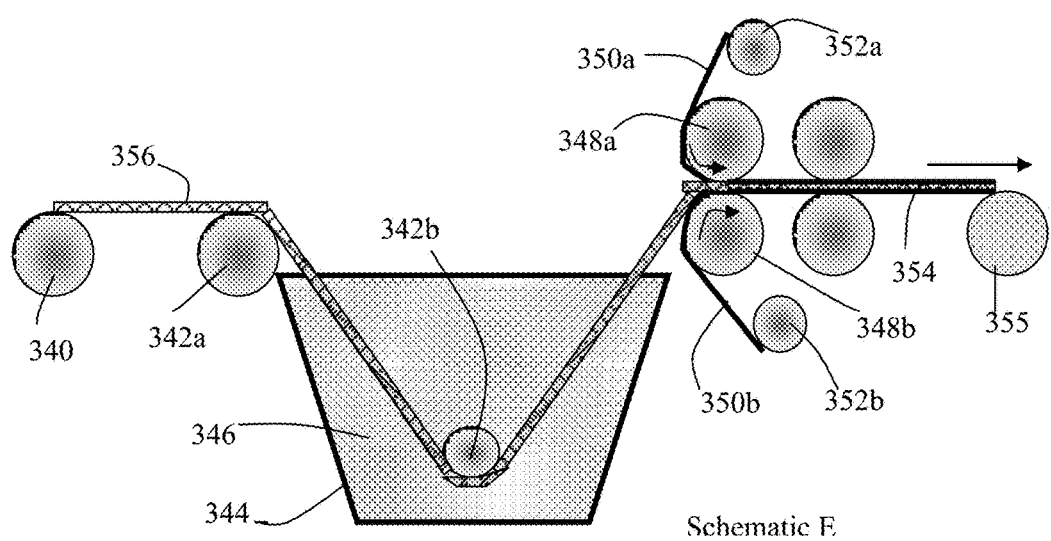
FIG. 1(E) Schematic of a presently invented process for continuously producing an alkali metal-sulfur battery electrode.
Figure 2:
FIG. 2 An electron microscopic image of isolated graphene sheets.
Figure 3A:
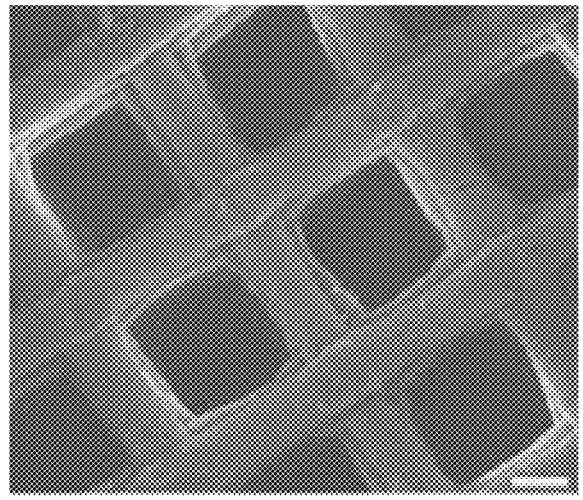
FIG. 3(A) Examples of conductive porous layers: metal grid/mesh and carbon nano-fiber mat.
Figure 3A:
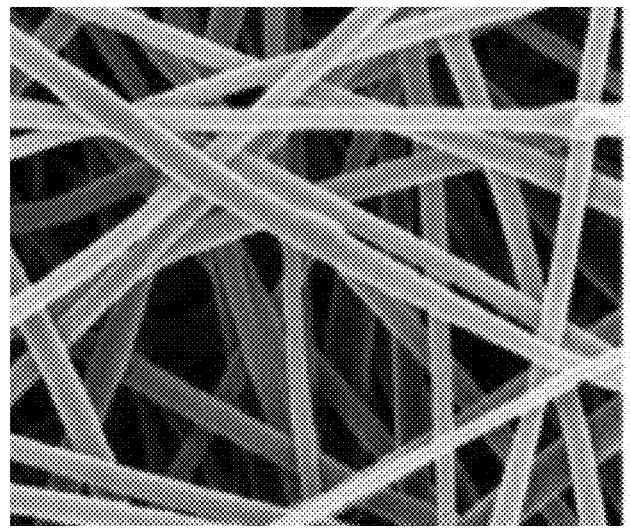
Figure 3B:
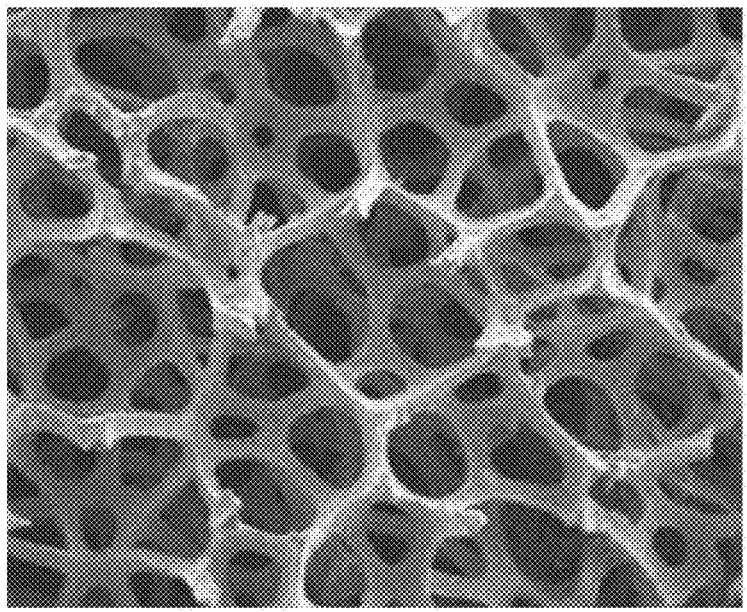
FIG. 3(B) Examples of conductive porous layers: graphene foam and carbon foam.
Figure 3B:
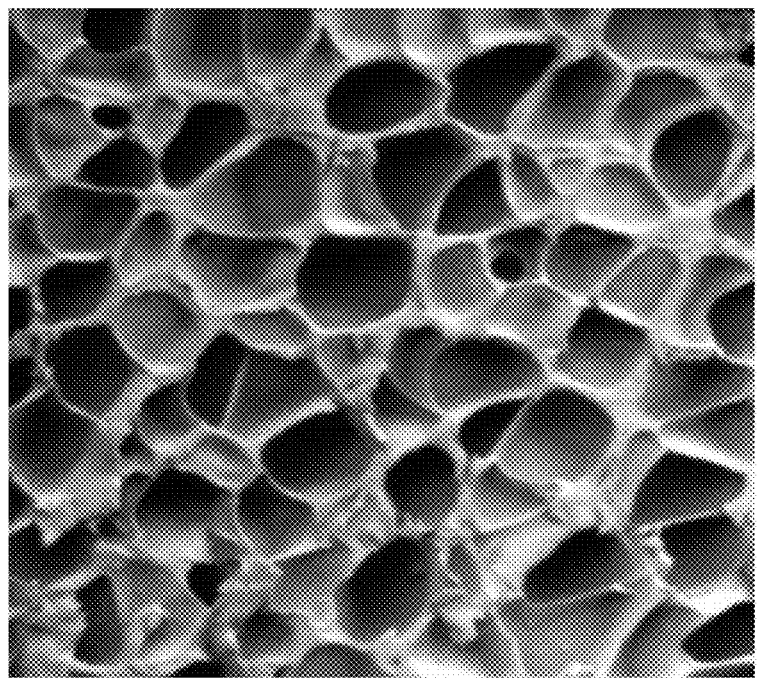
Figure 3C:
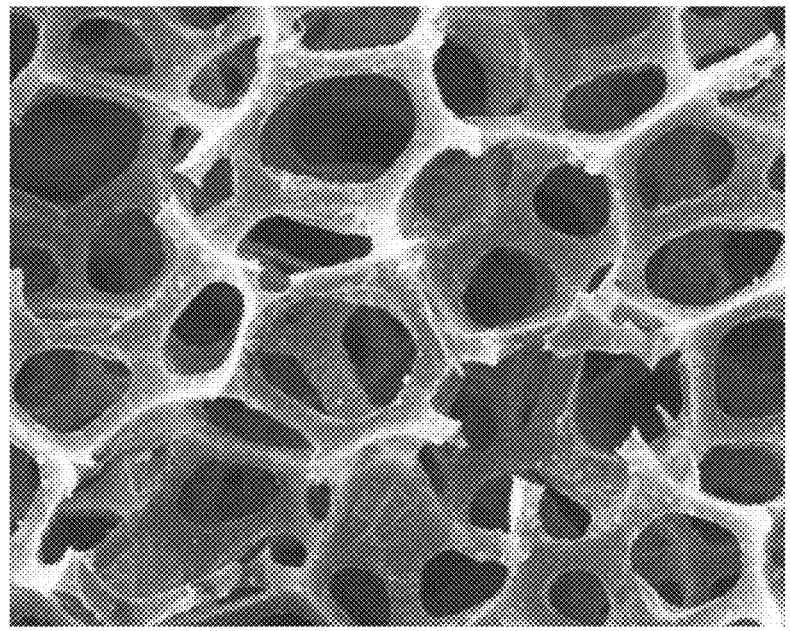
FIG. 3(C) Examples of conductive porous layers: graphite foam and Ni foam.
Figure 3C:
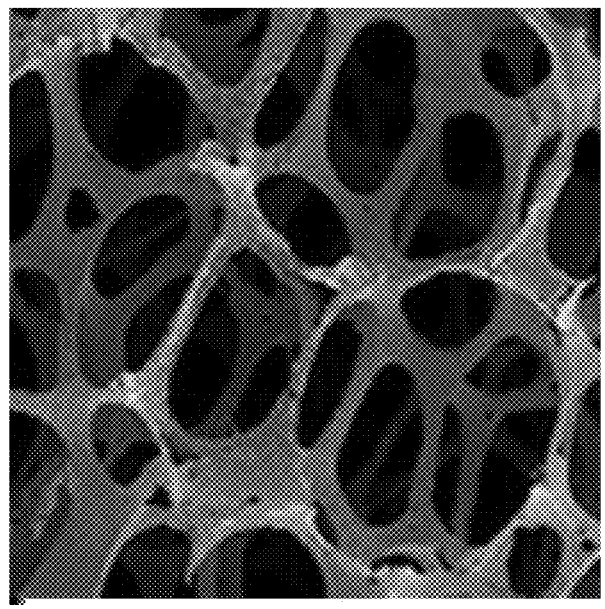
Figure 3D:
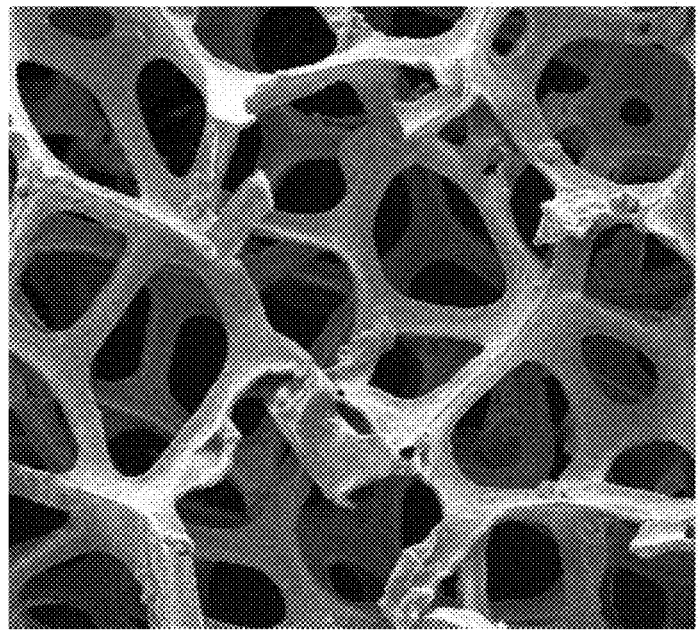
FIG. 3(D) Examples of conductive porous layers: Cu foam and stainless steel foam.
Figure 3D:
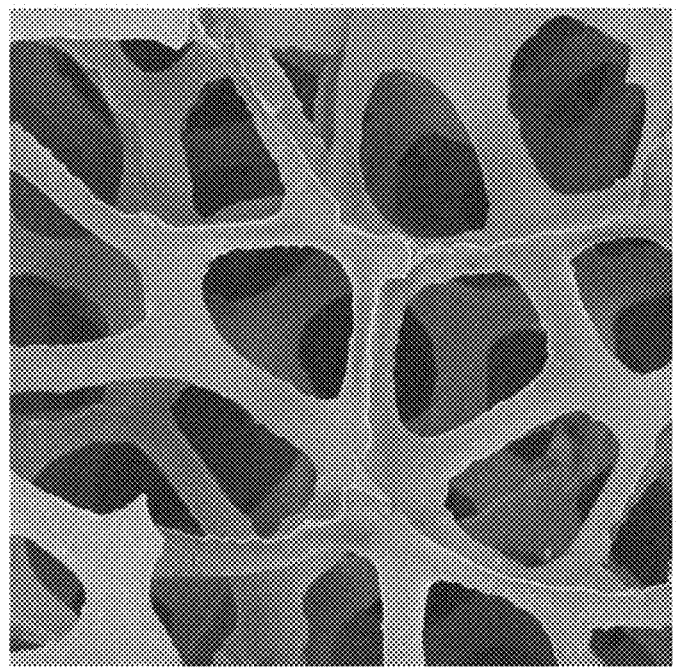

As another example, as illustrated in Schematic E of FIG. 1(E), the electrode production process begins by continuously feeding a conductive porous foam layer 356 of any cross-sectional shape from a feeder roller 340. The porous layer 356 is directed by a roller 342 to get immersed into a wet active material mixture mass 346 (slurry, suspension, gel, etc.) in a container 344. The active material mixture begins to impregnate into pores of the porous layer 356 as it travels toward roller 342b and emerges from the container to feed into the gap between two rollers 348a, 348b. Two protective films 350a, 350b are concurrently fed from two respective rollers 352a, 352b to cover the impregnated porous layer 354, which may be continuously collected on a rotating drum (a winding roller 355). The process is applicable to both the anode and the cathode electrodes.

The resulting electrode layer (anode or cathode electrode) can have a thickness or diameter from 100 nm to several centimeters (or thicker, if so desired). For a micro-cable (e.g. as a flexible power source for a micro-electronic device) the electrode thickness or diameter is from 100 nm to 100 µm, more typically from 1 µm to 50 µm, and most typically from 10 µm to 30 µm. For a macroscopic, flexible and conformal cable battery (e.g. for use in confined spaces in an electric vehicle, EV), the electrode typically and desirably has a thickness no less than 100 µm (preferably >200 µm, further preferably >300 µm, more preferably >400 µm; further more preferably >500 µm, 600 µm, or even >1,000 µm; no theoretical limitation on the electrode thickness.

The above are but several examples to illustrate how the presently invented flexible and shape-conformable cable-like alkali metal batteries can be made. These examples should not be used to limit the scope of the instant invention.

The electrically conductive porous layers may be selected from metal foam, metal web or screen, perforated metal sheet-based structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene aerogel, graphene foam, graphene oxide foam, reduced graphene oxide foam, carbon fiber foam, graphite fiber foam, exfoliated graphite foam, or a combination thereof. The porous layers must be made of an electrically conductive material, such as a carbon, graphite, metal, metal-coated fiber, conductive polymer, or conductive polymer-coated fiber, which is in a form of highly porous mat, screen/grid, non-woven, foam, etc. Examples of conductive porous layers are presented in FIG. 3(A), FIG. 3(B), FIG. 3(C), and FIG. 3(D). The porosity level must be at least 50% by volume, preferably greater than 70%, further preferably greater than 90%, and most preferably greater than 95% by volume. The backbone of the foam or the foam walls forms a network of electron-conducting pathways.

These foam structures can be readily made into any cross-sectional shape. They also can be very flexible; typically, non-metallic foams are more flexible than metallic foams. However, metal nano-fibers can be made into highly flexible foams. Since the electrolyte is in either a liquid or gel state, the resulting cable battery can be very flexible and can be made to be conformal to essentially any odd shape. Even when the salt concentration in a liquid solvent is high (e.g. from 2.5 M to 14 M), the foam structure containing electrolyte inside their pores remains deformable, bendable, twistable, and conformable to even an odd shape.

In some embodiments, the electrically conductive porous rod in the first electrode or the electrically conductive porous layer in the second electrode contains a conductive polymer fiber, a carbon/graphite fiber, a fiber tow, fiber yarn, fiber braid, fiber knit structure that is made of a conductive polymer, carbon, or graphite fiber and is porous.

Preferably, substantially all of the pores in the original conductive porous layers are filled with the electrode active material (anode or cathode), electrolyte, and optional conductive additive (no binder resin needed). Since there are great amounts of pores (more typically 70-99% or preferably 85%-99%) relative to the pore walls or conductive pathways (1-30%), very little space is wasted ("being wasted" means not being occupied by the electrode active material and electrolyte), resulting in high proportion of electrode active material-electrolyte mixture (high active material loading mass).

In such battery electrode configurations (e.g. FIG. 1(C)), the electrons only have to travel a short distance (half of the pore size, on average; e.g. nanometers or a few micrometers) before they are collected by the pore walls since pore walls are present everywhere throughout the entire electrode structure (the conductive foam serving as a current collector). These pore walls form a 3-D network of interconnected electron-transporting pathways with minimal resistance. Additionally, in each anode electrode or cathode electrode, all electrode active material particles are pre-dispersed in a liquid electrolyte (no wettability issue), eliminating the existence of dry pockets commonly present in an electrode prepared by the conventional process of wet coating, drying, packing, and electrolyte injection. Thus, the presently invented process produces a totally unexpected advantage over the conventional battery cell production process.

In a preferred embodiment, the anode active material is a prelithiated or pre-sodiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. Graphene materials are also a good conductive additive for both the anode and cathode active materials of an alkali metal battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Figure 4A:
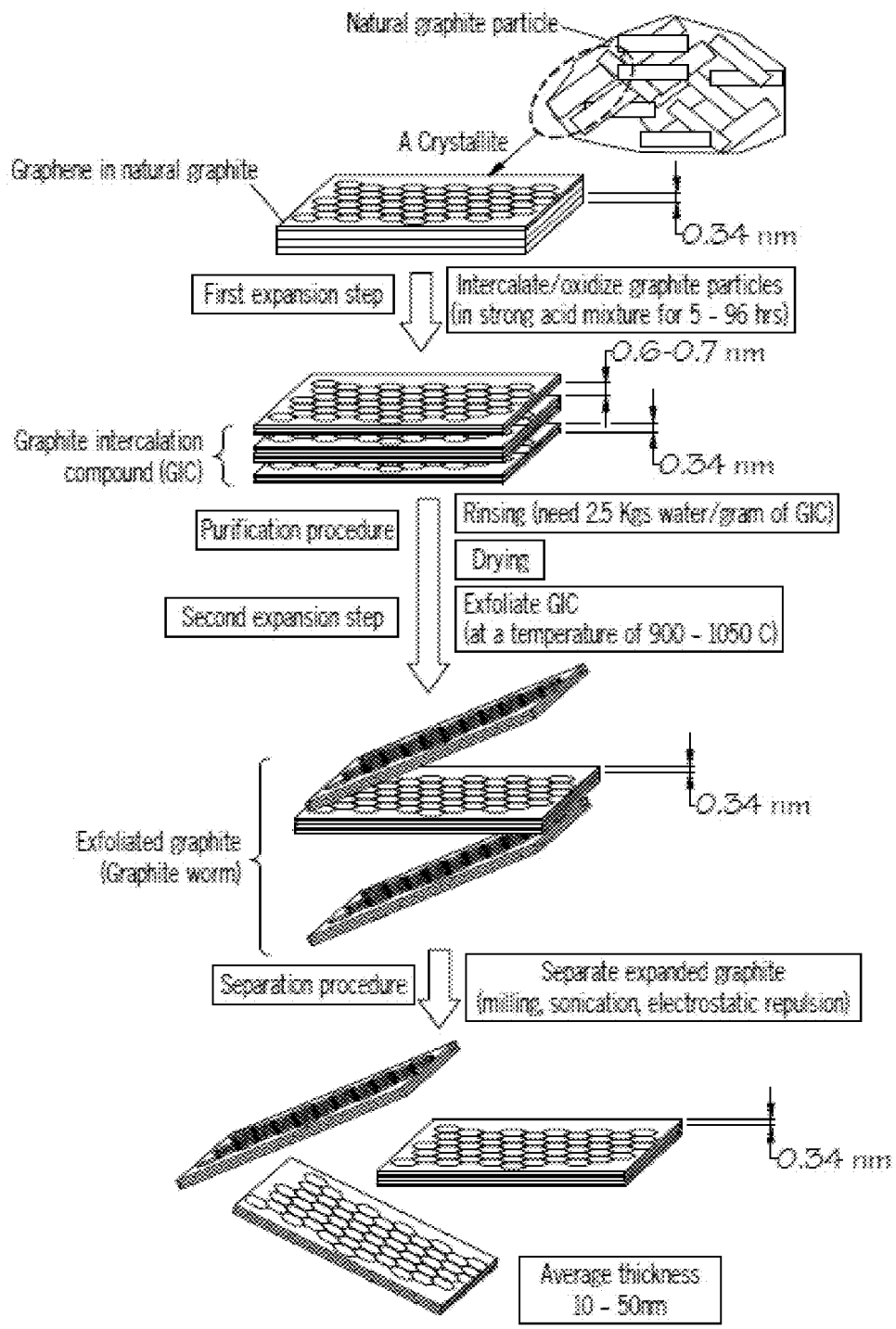
FIG. 4(A) Schematic of a commonly used process for producing exfoliated graphite, expanded graphite flakes (thickness>100 nm), and graphene sheets (thickness<100 nm, more typically <10 nm, and can be as thin as 0.34 nm).
Figure 4:
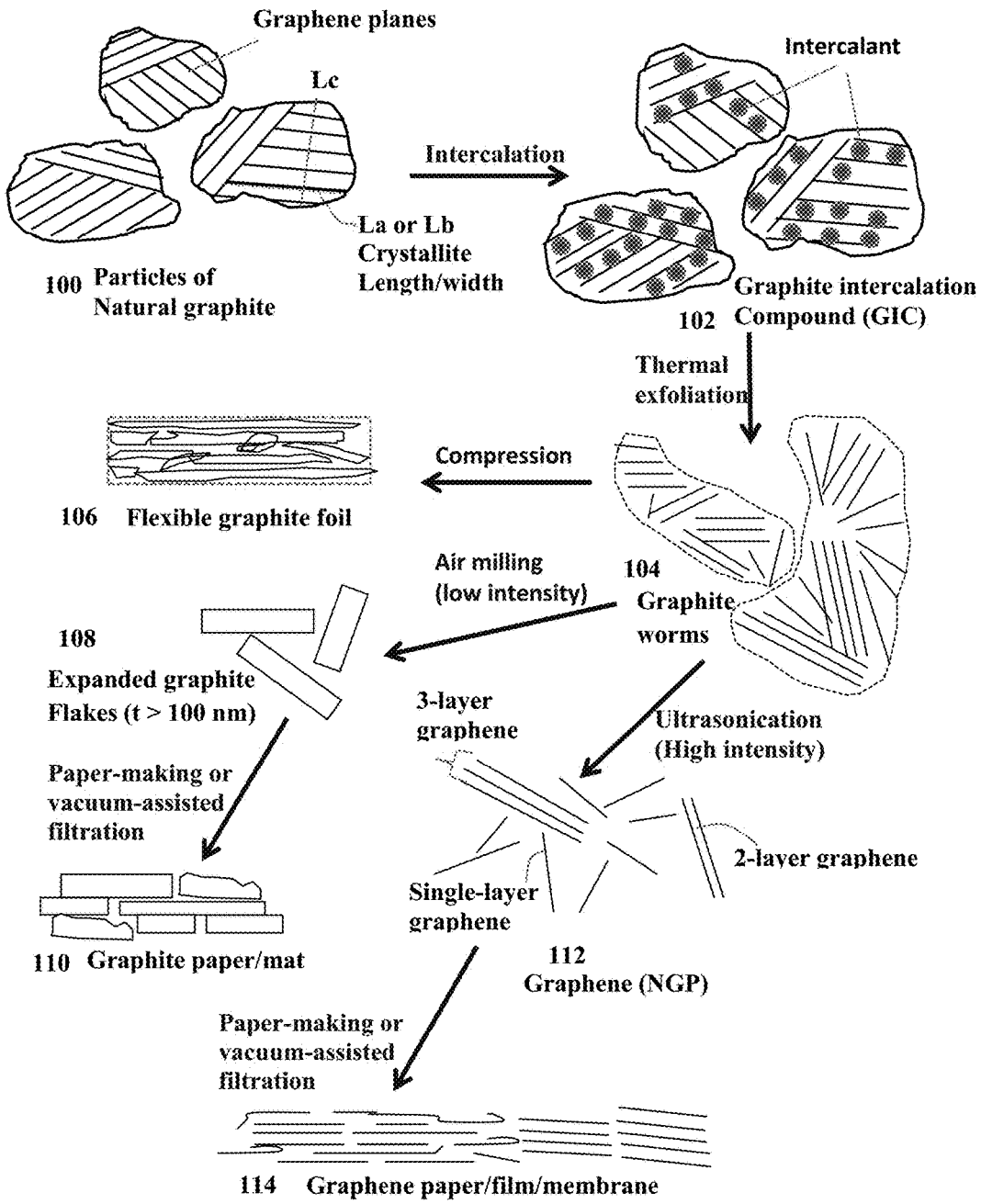
FIG. 4 (B) Schematic drawing to illustrate the processes for producing exfoliated graphite, expanded graphite flakes, and isolated graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a porous graphene film (114 in FIG. 4(B)) using a film-making process. Alternatively, with a low-intensity shearing, graphite worms tend to be separated into the so-called expanded graphite flakes (108 in FIG. 4(B) having a thickness>100 nm. These flakes can be formed into graphite mat or nonwoven 106 using mat-making process, with or without a resin binder, to form an expanded graphite foam. Graphite foams can be made by graphitization of carbon foams as well.

In some embodiments, the first electrode or second electrode contains particles, foil, or coating of Li, Na, or a combination thereof as an electrode active material.

There is no particular restriction on the types of anode active materials that can be used in practicing the instant invention. Preferably, in the invented process, the anode active material absorbs alkali ions (e.g. lithium ions) at an electrochemical potential of less than 1.0 volt (preferably less than 0.7 volts) above the Li/Li$^+$ (i.e. relative to Li→Li$^+$+e$^-$ as the standard potential) the Na/Na$^+$ reference when the battery is charged. In one preferred embodiment, the anode active material is selected from the group consisting of: (a) Particles of natural graphite, artificial graphite, meso-carbon microbeads (MCMB), and carbon (including soft carbon, hard carbon, carbon nano-fiber, and carbon nano-tube); (b) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (Si, Ge, Al, and Sn are most desirable due to their high specific capacities; (c) Alloys or intermetallic compounds of Si, Ge, Sn, Pb, Sb, Bi, Zn, Al, or Cd with other elements, wherein the alloys or compounds are stoichiometric or non-stoichiometric (e.g. SiAl, SiSn); (d) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites (e.g. SnO, $TiO_2$, $Co_3O_4$, etc.); (e) Pre-lithiated or pre-sodiated versions thereof (e.g. pre-lithiated $TiO_2$, which is lithium titanate); (f) Pre-lithiated or pre-sodiated graphene sheets; and combinations thereof.

In another preferred embodiment, the anode active material is a pre-sodiated or pre-lithiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. Graphene materials are also a good conductive additive for both the anode and cathode active materials of an alkali metal battery.

In the rechargeable alkali metal-sulfur battery, the anode may contain an alkali ion source selected from an alkali metal, an alkali metal alloy, a mixture of alkali metal or alkali metal alloy with an alkali intercalation compound, an alkali element-containing compound, or a combination thereof. Particularly desired is an anode active material that contains an alkali intercalation compound selected from petroleum coke, carbon black, amorphous carbon, hard carbon, templated carbon, hollow carbon nanowires, hollow carbon sphere, natural graphite, artificial graphite, lithium or sodium titanate, $NaTi_2(PO_4)_3$, $Na_2Ti_3O_7$ (Sodium titanate), $Na_2C_8H_4O_4$ (Disodium Terephthalate), $Na_2TP$ (Sodium Terephthalate), $TiO_2$, $Na_xTiO_2$ (x=0.2 to 1.0), carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof. In an embodiment, the anode may contain a mixture of 2 or 3 types of anode active materials (e.g. mixed particles of activated carbon+$NaTi_2(PO_4)_3$ or a mixture of Li particles and graphite particles).

The first or second liquid electrolyte in the invented process or battery may be selected from an aqueous electrolyte, organic electrolyte, ionic liquid electrolyte, mixture of an organic electrolyte and an ionic electrolyte, or a mixture thereof with a polymer. In some embodiments, the aqueous electrolyte contains a sodium salt or a potassium salt dissolved in water or a mixture of water and alcohol. In some embodiments, the sodium salt or potassium salt is selected from $Na_2SO_4$, $K_2SO_4$, a mixture thereof, NaOH, LiOH, NaCl, LiCl, NaF, LiF, NaBr, LiBr, NaI, LiI, or a mixture thereof.

A wide range of electrolytes can be used for practicing the instant invention. Most preferred are non-aqueous organic and/or ionic liquid electrolytes. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred.

The content of aforementioned electrolytic salts in the non-aqueous solvent is preferably greater than 2.5 M (mol/l), more preferably >3.0 M, further more preferably >5.0 M, still more preferably >7.0 M, and most preferably >10 M. An electrolyte containing a higher concentration of alkali metal salt makes it easier to form a cable-shape battery that does not have the tendency to leak during manufacturing or during bending or twisting of the cable battery. Further surprisingly, we have observed that most of the electrolytes become non-flammable when the salt concentration exceeds 3.5M. Some becomes non-flammable at a salt concentration greater than 3.0 M or just >2.5 M. Battery scientists and engineers would expect that higher concentration means higher viscosity and lower ion mobility and, hence, lower alkali ion conductivity. We have found that this trend is generally true of the salt concentration range of 0.01 M to 2.0 M. However, quite unexpectedly, the alkali ion conductivity ($Li^+$, $Na^+$, and $K^+$ ions) begins to increase after the concentration is increased to become greater than a threshold level (typically between 2.1 and 3.0 M).

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a battery.

The specific capacity and specific energy of a Li—S cell or Na—S cell are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). A high-capacity and high-energy Li—S or Na—S cell requires a high amount of S in the cathode active layer (i.e. relative to the amounts of non-active materials, such as the binder resin, conductive additive, and other modifying or supporting materials) and a high S utilization efficiency). The present invention provides such a sulfur or sulfide-containing cathode active layer and a method of producing such a cathode active layer (e.g. a pre-sulfurized active cathode layer).

It may be noted that sulfur or a sulfur compound (e.g. particles of lithium polysulfide, sodium polysulfide, carbon-polymer compound, sulfur carried by activated carbon particles, sulfur or sulfide carried on graphene surfaces, etc.) may be incorporated into the pores of a foam structure as described earlier and illustrated in FIG. 1(D) and FIG. 1(E). Additionally and preferably, a highly innovative method may be used to incorporate sulfur or sulfur compound, with or without the eventual electrolyte, into a foam structure. Such a pre-sulfurization method enables us to achieve both a high sulfur content and thin sulfur coating/particle sizes, two features that were previously regarded as mutually exclusive. As an example of sulfur pre-loading procedures, this method comprises the following four steps, (a)-(d):

a) Preparing a layer of porous graphene/graphite/carbon structure having pores and massive surfaces with a specific surface area greater than 100 $m^2/g$ (these surfaces must be accessible to electrolyte). The porous graphene/carbon/graphite structure have a specific surface area preferably >500 $m^2/g$ and more preferably >700 $m^2/g$, and most preferably >1,000 $m^2/g$. Many types of graphene/carbon/graphite foam structures may be used, including carbon foam, graphite foam, carbon aerogel foam, graphene foam, graphene aerogel foam, electron-spun carbon foam, carbon/graphite fiber mat, carbon/graphite fiber cloth, carbon/graphite carbon paper, carbon nano-fiber mat/paper/cloth, carbon nanotube mat/paper/cloth, activated carbon particles (bonded together to form a foam, for instance), and exfoliated graphite foam, etc.

b) Preparing an electrolyte comprising a solvent (e.g. non-aqueous solvent, such as organic solvent and or ionic liquid) and a sulfur source (e.g. metal polysulfide) dissolved or dispersed in the solvent. This electrolyte can be the same electrolyte as in the intended battery;

c) Preparing an anode;

d) Bringing the integral layer of porous graphene/carbon/graphite structure and the anode in ionic contact with the electrolyte (e.g. by immersing all these components in a chamber that is external to the intended Li—S cell, or encasing these three components inside the Li—S cell) and imposing an electric current between the anode and the integral layer of porous graphene/carbon/graphite structure (serving as a cathode) with a sufficient current density for a sufficient period of time to electrochemically deposit nano-scaled sulfur particles or coating on the graphene surfaces or internal pore walls of a graphite/carbon structure to form a pre-sulfurized foam structure (e.g. a rod or layer);

The S particles or coating in the presently invented pre-sulfurized foam structure typically have a thickness or diameter smaller than 20 nm (preferably <10 nm, more preferably <5 nm, and further preferably <3 nm) and wherein the nano-scaled sulfur particles or coating occupy a weight fraction of at least 70% (preferably >80%, more preferably >90%, and most preferably >95%) based on the total weights of the sulfur particles or coating and the graphene material combined. It is advantageous to deposit as much S as possible yet still maintain ultra-thin thickness or diameter of the S coating or particles (e.g. >80% and <3 nm; >90% and <5 nm; and >95% and <10 nm, etc.).

The layer of porous graphene/graphite/carbon structure recited in step (a) may contain a graphene material or an exfoliated graphite material, wherein the graphene material is selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, and wherein the exfoliated graphite material is selected from exfoliated graphite worms, expanded graphite flakes, or recompressed graphite worms or flakes (must still exhibit a high specific surface area, >>100 m²/g, accessible to electrolyte).

Once a layer of porous graphene/carbon/graphite structure is prepared, this layer can be immersed in an electrolyte (preferably liquid electrolyte), which comprises a solvent and a sulfur source dissolved or dispersed in the solvent. This layer basically serves as a cathode in an external electrochemical deposition chamber.

Subsequently, an anode layer is also immersed in the chamber. Any conductive material can be used as an anode material, but preferably this layer contains some lithium or sodium. In such an arrangement, the layer of porous graphene/carbon/graphite structure and the anode are in ionic contact with the electrolyte. An electric current is then supplied between the anode and the integral layer of porous graphene structure (serving as a cathode) with a sufficient current density for a sufficient period of time to electrochemically deposit nano-scaled sulfur particles or coating on the graphene surfaces to form the pre-sulfurized active cathode layer. The required current density depends upon the desired speed of deposition and uniformity of the deposited material.

This current density can be readily adjusted to deposit S particles or coating that have a thickness or diameter smaller than 20 nm (preferably <10 nm, more preferably <5 nm, and further preferably <3 nm). The resulting nano-scaled sulfur particles or coating occupy a weight fraction of at least 70% (preferably >80%, more preferably >90%, and most preferably >95%) based on the total weights of the sulfur particles or coating and the graphene material combined.

In one preferred embodiment, the sulfur source is selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

In one embodiment, the anode comprises an anode active material selected from an alkali metal, an alkaline metal, a transition metal, a metal from groups 13 to 17 of the periodic table, or a combination thereof. This anode can be the same anode intended for inclusion in a Li—S cell.

The solvent and lithium or sodium salt used in the electrochemical deposition chamber may be selected from any solvent or salt in the list given above for a lithium-sulfur or sodium-sulfur battery.

After an extensive and in-depth research effort, we have come to realize that such a pre-sulfurization surprisingly solves several most critical issues associated with current Li—S or Na—S cells. For instance, this method enables the sulfur to be deposited in a thin coating or ultra-fine particle form, thus, providing ultra-short lithium ion diffusion paths and, hence, ultra-fast reaction times for fast battery charges and discharges. This is achieved while maintaining a relatively high proportion of sulfur (the active material responsible for storing lithium) and, thus, high specific lithium storage capacity of the resulting cathode active layer in terms of high specific capacity (mAh/g, based on the total weight of the cathode layer, including the masses of the active material, S, supporting graphene sheets, binder resin, and conductive filler).

It is of significance to note that one might be able to use a prior art procedure to deposit small S particles, but not a high S proportion, or to achieve a high proportion but only in large particles or thick film form. But, the prior art procedures have not been able to achieve both at the same time. This is why it is such an unexpected and highly advantageous thing to obtain a high sulfur loading and yet, concurrently, maintaining an ultra-thin/small thickness/diameter of sulfur. This has not been possible with any prior art sulfur loading techniques. For instance, we have been able to deposit nano-scaled sulfur particles or coating that occupy a >90% weight fraction of the cathode layer and yet maintaining a coating thickness or particle diameter <3 nm. This is quite a feat in the art of lithium-sulfur batteries. As another example, we have achieved a >95% S loading at an average S coating thickness of 4.8-7 nm.

Electrochemists or materials scientists in the art of Li—S batteries would expect that a greater amount of highly conducting graphene sheets or graphite flakes (hence, a smaller amount of S) in the cathode active layer should lead to a better utilization of S, particularly under high charge/ discharge rate conditions. Contrary to these expectations, we have observed that the key to achieving a high S utilization efficiency is minimizing the S coating or particle size and is independent of the amount of S loaded into the cathode provided the S coating or particle thickness/diameter is small enough (e.g. <10 nm, or even better if <5 nm). The problem here is that it has not been possible to maintain a thin S coating or small particle size if S is higher than 50% by weight. Here we have further surprisingly observed that the key to enabling a high specific capacity at the cathode under high rate conditions is to maintain a high S loading and still keep the S coating or particle size as small as possible, and this is accomplished by using the presently invented pre-sulfurization method.

The electrons coming from or going out through the external load or circuit must go through the conductive additives (in a conventional sulfur cathode) or a conductive framework (e.g. exfoliated graphite meso-porous structure or nano-structure of conductive graphene sheets as herein disclosed) to reach the cathode active material. Since the cathode active material (e.g. sulfur or lithium polysulfide) is a poor electronic conductor, the active material particle or coating must be as thin as possible to reduce the required electron travel distance.

Furthermore, the cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material utilization rate is typically less than 75% (or even <50%). This has been a major issue in the art of Li—S cells and there has been no solution to this problem. Most surprisingly, the implementation of massive graphene surfaces associated with a porous graphene structure as a conductive supporting material for sulfur or lithium polysulfide has made it possible to achieve an active material utilization rate of typically >>80%, more often greater than 90%, and, in many cases, close to 95%-99%.

Alternatively, the cathode active material (e.g. S or a sulfur compound) may be deposited on or bonded by a functional material or nano-structured material. The sulfur compound may be selected from organo-sulfur, polymer-sulfur, carbon-sulfur, metal sulfide, S—Sb, S—Bi, S—Se, S—Te mixture, or a combination thereof. These species may be supported by a conductive carrier particle, such as activated carbon or small graphene piece. The functional material or nano-structured material may be selected from the group consisting of (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nano-fiber, nano-wire, metal oxide nano-wire or fiber, conductive polymer nano-fiber, or a combination thereof; (e) a carbonyl-containing organic or polymeric molecule; (f) a functional material containing a carbonyl, carboxylic, or amine group; and combinations thereof. In a preferred embodiment, the functional material or nano-structured material has a specific surface area of at least 500 $m^2/g$, preferably at least 1,000 $m^2/g$.

Typically, the cathode active materials (sulfur or metal sulfide) are not electrically conducting. Hence, in one embodiment, the cathode active material may be mixed with a conductive filler, such as carbon black (CB), acetylene black (AB), graphite particles, expanded graphite particles, activated carbon, meso-porous carbon, meso-carbon micro bead (MCMB), carbon nano-tube (CNT), carbon nano-fiber (CNF), graphene sheet (also referred to as nano graphene platelet, NGP), carbon fiber, or a combination thereof. These carbon/graphite/graphene materials, containing sulfur or polysulfide, may be made into fine particles as the cathode active material to be incorporated in pores of the foam structure in the invented Li—S or Na—S cell.

In a preferred embodiment, the nano-scaled filaments (e.g. CNTs, CNFs, and/or NGPs) are formed into a porous nano-structure that contains massive surfaces to support either the anode active material (e.g. Na or Li coating) or the cathode active material (e.g. S). The porous nano-structure should have pores having a pore size preferably from 2 nm to 50 nm, preferably 2 nm-10 nm. These pores are properly sized to accommodate the electrolyte at the cathode side and to retain the cathode active material in the pores during repeated charges/discharges. The same type of nano-structure may be implemented at the anode side to support the anode active material.

At the anode side, when an alkali metal is used as the sole anode active material in an alkali metal cell, there is concern about the formation of dendrites, which could lead to internal shorting and thermal runaway. Herein, we have used two approaches, separately or in combination, to addressing this dendrite formation issue: one involving the use of a high-concentration electrolyte and the other the use of a nano-structure composed of conductive nano-filaments to support the alkali metal at the anode. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Surprisingly and significantly, the nano-structure provides an environment that is conducive to uniform deposition of alkali metal ions during the battery re-charge, to the extent that no geometrically sharp structures or dendrites were found in the anode after a large number of cycles. Not wishing to be bound by any theory, but the applicants envision that the 3-D network of highly conductive nano-filaments provide a substantially uniform attraction of alkali metal ions back onto the filament surfaces during re-charging. Furthermore, due to the nanometer sizes of the filaments, there is a large amount of surface area per unit volume or per unit weight of the nano-filaments. This ultra-high specific surface area offers the alkali metal ions an opportunity to uniformly deposit a thin coating on filament surfaces. The high surface area readily accepts a large amount of alkali metal ions in the liquid electrolyte, enabling high re-charge rates for an alkali metal secondary battery.

The presently invented cable-shaped battery has many unique features and some of these features and advantages are summarized below:

By definition, a cable shape means a shape that has a length and a diameter or thickness wherein the aspect ratio (length-to-diameter or length-to-thickness ratio) is at least 10 and preferably at least 20. The cable-shaped alkali metal battery can have a length greater than 1 m, or even greater than 100 m. The length can be as short as 1 µm, but typically from 10 µm to 10 m and more typically from micrometers to a few meters. Actually, there is no theoretical limitation on the length of this type of cable battery.

The invented cable-shaped alkali metal battery is so flexible that the battery can be easily bent to have a radius of curvature greater than 10 cm. The battery is bendable to substantially conform to the shape of a void or interior compartment in a vehicle. The void or interior compartment may be a trunk, door, hatch, spare tire compartment, roof, area under seat, or area under dashboard. The battery is removable from a vehicle and is bendable to conform to the shape of a different void or interior compartment.

One or more units of instant cable-shape battery can be incorporated into a garment, belt, luggage strap, weaponry strap, musical instrument strap, helmet, hat, boot, foot covering, glove, wrist covering, watch band, jewelry item, animal collar or animal harness.

One or more units of instant cable-shaped battery can be removably incorporated in a garment, belt, luggage strap, weaponry strap, musical instrument strap, helmet, hat, boot, foot covering, glove, wrist covering, watch band, jewelry item, animal collar or animal harness.

Additionally, the invented battery conforms to the interior radius of a hollow bicycle frame.

In what follows, we provide examples for a large number of different types of anode active materials, cathode active materials (from sulfur to various sulfur compounds), and conductive porous layers (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1: Illustrative Examples of Electronically Conductive Porous Rods or Layers as an Active Material/Electrolyte-Accommodating Current Collector Various types of metal foams, carbon foams, and fine metal webs/screens are commercially available for use as conductive porous rods or layers in an anode or cathode (serving as a current collector); e.g. Ni foam, Cu foam, Al foam, Ti foam, Ni mesh/web, stainless steel fiber mesh, etc. Metal-coated polymer foams and carbon foams are also used as current collectors. For making macroscopic cable-shaped flexible and shape-conformable batteries, the most desirable thickness ranges for these conductive porous layers are 50-1000 µm, preferably 100-800 µm, more preferably 200-600 µm. For making microscopic cable-shape batteries (having a diameter from 100 nm to 100 µm, for instance), graphene foams, graphene aerogel foam, porous carbon fibers (e.g. made by electro-spinning polymer fibers, carbonizing the polymer fibers, and activating the resulting carbon fibers), and porous graphite fibers can be used to accommodate the mixture of an electrode active material and electrolyte.

Example 2: Ni Foam and CVD Graphene Foam-Based Porous Layers Supported on Ni Foam Templates The procedure for producing CVD graphene foam was adapted from that disclosed in open literature: Chen, Z. et al. "Three-dimensional flexible and conductive interconnected graphene networks grown by chemical vapor deposition," Nature Materials, 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented lithium batteries: Ni foam, CVD graphene-coated Ni form, CVD graphene foam (Ni being etched away), and conductive polymer bonded CVD graphene foam.

In order to recover (separate) graphene foam from the supporting Ni foam, Ni frame was etched away. In the procedure proposed by Chen, et al., before etching away the nickel skeleton by a hot HCl (or $FeCl_3$) solution, a thin layer of poly (methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, a conducting polymer was used as a binder resin to hold graphene together while Ni was etched away. The graphene foam or Ni foam thickness range was from 35 µm to 600 µm.

The layers of Ni foam or the CVD graphene foam used herein is intended as conductive porous layers (CPL) to accommodate the ingredients (anode or cathode active material+optional conductive additive+liquid electrolyte) for the anode or cathode or both. For instance, Si nano particles or surface-stabilized Li particles dispersed in an organic liquid electrolyte (e.g. 1.0-5.5 M of $LiPF_6$ dissolved in PC-EC) were made into gel-like mass, which was delivered to a porous surface of a Ni foam continuously fed from a feeder roller to make an anode electrode roller (as in Schematic A of FIG. 1(C)).

Graphene-supported lithium polysulfide nano particles dispersed in the same liquid electrolyte were made into cathode slurry, which was sprayed over two porous surfaces of a continuous Ni foam layer to form a cathode electrode. A porous foam rod containing Si nano particle-electrolyte mixture impregnated into the foam pores (the first electrode) was wrapped around by a porous separator layer (porous PE-PP copolymer), which in turn was wrapped around by a lithium sulfide-based cathode layer. The cylindrical structure is then encased in a thin polymer sheath to obtain a cable-shape lithium-ion battery.

Example 3: Graphitic Foam-Based Conductive Porous Layers from Pitch-Based Carbon Foams Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon. The graphite foam layers are available in a thickness range of 75-500 μm.

Example 4: Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities.

Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as a conductive additive in either or both of the anode and cathode active material in certain lithium batteries presently invented. Pre-lithiated RGO (e.g. RGO+ lithium particles or RGO pre-deposited with lithium coating) was also used as an anode active material that was mixed with a liquid electrolyte to form wet anode active material mixtures for use in selected lithium-ion cells. Selected cathode active materials ($Li_2S$ nano particles) and non-lithiated RGO sheets were dispersed in a liquid electrolyte to prepare wet cathode active material mixture. The wet anode active mixture and cathode active mixtures were separately delivered to surfaces of graphite foams for forming an anode layer and a cathode layer, respectively. Cable-shape batteries were then fabricated, wherein the core structure (first electrode) was either an anode or a cathode and the second electrode was a corresponding counter electrode (either a cathode or an anode).

For comparison purposes, slurry coating and drying procedures were conducted to produce conventional electrodes. Electrodes and a separator disposed between two dried electrodes were then assembled and encased in an Al-plastic laminated packaging envelop, followed by liquid electrolyte injection to form a conventional lithium battery cell.

Example 5: Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive having a high electrical and thermal conductivity. Pre-lithiated pristine graphene and pre-sodiated pristine graphene were also used as an anode active material for a lithium-ion battery and a sodium-ion battery, respectively. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, as a conductive additive, along with an anode active material (or cathode active material in the cathode) were then incorporated in a battery using both the presently invented procedure and conventional procedure of slurry coating, drying and layer laminating. Both lithium-ion batteries and lithium metal batteries (impregnation into anode only) were investigated. Sodium-ion cells were also prepared and studied.

Example 6: Preparation of Pre-Sodiated Graphene Fluoride Sheets as an Anode Active Material of a Sodium-Sulfur Battery Several processes have been used by us to produce graphene fluoride (GF), but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with sodium chips in a liquid electrolyte, allowing for pre-sodiation to occur before or after impregnation into pores of an anode current collector.

Example 7: Preparation of Nitrogenataed Graphene Nano Sheets and Porous Graphene Structures Graphene oxide (GO), synthesized in Example 1, was finely ground with different proportions of urea and the pelletized mixture heated in a microwave reactor (900 W) for 30 s.

The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenataed graphene sheets remain dispersible in water. Two types of dispersions were then prepared. One involved adding water-soluble polymer (e.g. polyethylene oxide) into the nitrogenated graphene sheet-water dispersion to produce a water-based suspension. The other involved drying the nitrogenated graphene sheet-water dispersion to recover nitrogenated graphene sheets, which were then added into precursor polymer-solvent solutions to obtain organic solvent-based suspensions.

The resulting suspensions were then cast, dried, carbonized and graphitized to produce porous graphene structures. The carbonization temperatures for comparative samples are 900-1,350° C. The graphitization temperatures are from 2,200° C. to 2,950° C. The porous graphene layers are used as the porous current collectors for both the anode and the cathode of Li—S cells.

Example 8: Conductive Web of Filaments from Electro-Spun PAA Fibrils as a Supporting Layer for the Anode Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain carbonized nano-fibers with an average fibril diameter of 67 nm. Such a web can be used as a conductive substrate for an anode active material. We observe that the implementation of a network of conductive nano-filaments at the anode of a Li—S or room temperature Na—S cell can effectively suppress the initiation and growth of lithium or sodium dendrites that otherwise could lead to internal shorting.

Example 9: Electrochemical Deposition of S on Various Webs or Porous Structures (External Electrochemical Deposition) for Li—S and Na—S Batteries The electrochemical deposition may be conducted before the cathode active layer is incorporated into an alkali metal-sulfur battery cell (Li—S or Na—S cell). In this approach, the anode, the electrolyte, and the integral layer of porous graphene structure (serving as a cathode layer) are positioned in an external container outside of a lithium-sulfur cell. The needed apparatus is similar to an electro-plating system, which is well-known in the art.

In a typical procedure, a metal polysulfide ($M_xS_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution is then poured into a chamber or reactor under a dry and controlled atmosphere condition (e.g. He or Nitrogen gas). A metal foil can be used as the anode and a layer of the porous graphene foam or carbon foam structure as the cathode; both being immersed in the electrolyte solution. This configuration constitutes an electrochemical deposition system. The step of electrochemically depositing nano-scaled sulfur particles or coating on the graphene surfaces is conducted at a current density preferably in the range of 1 mA/g to 10 A/g, based on the layer weight of the porous graphene structure.

The chemical reactions that occur in this reactor may be represented by the following equation: $M_xS_y \rightarrow M_xS_{y-z} + zS$ (typically z=1-4). Quite surprisingly, the precipitated S is preferentially nucleated and grown on massive graphene surfaces to form nano-scaled coating or nano particles. The coating thickness or particle diameter and the amount of S coating/particles may be controlled by the specific surface area, electro-chemical reaction current density, temperature and time. In general, a lower current density and lower reaction temperature lead to a more uniform distribution of S and the reactions are easier to control. A longer reaction time leads to a larger amount of S deposited on surfaces of pore walls and the reaction is ceased when the sulfur source is consumed or when a desired amount of S is deposited. These S-coated foam structures were then used as the cathode layer of a cable-shape Li—S or Na—S cell.

Example 10: Chemical Reaction-Induced Deposition of Sulfur Particles in Carbon Nano-Fiber Mat A chemical deposition method is herein utilized to prepare S coating deposited in the pores of a carbon nano-fiber mat. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a graphene-impregnated structure was prepared by a chemical deposition method in an aqueous solution. A layer of nano-fiber mat was dipped into the $Na_2S_x$ solution. Approximately 100 ml of 2 mol/L HCOOH solution was added into the $Na_2S$, solution at a rate of 30-40 drops/min and stirred for 2 hours. After deposition of S in the mat was allowed to proceed for 3 hours, the porous mat structure was washed with acetone and distilled water several times to eliminate salts and impurities. The reaction may be represented by the following reaction: $S_x^{2-}+2H^+\rightarrow(x-1)S+H_2S$. Subsequently, the S-impregnated mat was dried at 50° C. in a drying oven for 48 hours.

Example 11: Redox Chemical Reaction-Induced Deposition of Sulfur in Graphite Foam In this chemical reaction-based deposition process, sodium thiosulfate ($Na_2S_2O_3$) was used as a sulfur source and HCl as a reactant. A rod of graphite foam was prepared and then immersed into a solution containing the two reactants (HCl and $Na_2S_2O_3$). The reaction was allowed to proceed at 25-75° C. for 1-3 hours, leading to the precipitation of S particles deposited on surfaces of GO sheets. The reaction may be represented by the following reaction:

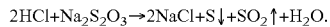

$2HCl+Na_2S_2O_3\rightarrow 2NaCl+S\downarrow+SO_2\uparrow+H_2O$.

Example 12: Preparation of S-Impregnated Foam Via Solution Deposition

Sulfur powder was mixed and dispersed in a solvent ($CS_2$) to form a solution. A piece of Ni foam was immersed into the solution and, subsequently, the solvent was evaporated, allowing S to get precipitated out to yield a S-impregnated structure.

Example 13: Graphene-Enhanced Nano Silicon Fabricated from TEOS as an Anode Active Material of a Lithium-Ion Battery Dilute 1 wt. % N002-PS to 0.2 wt. % N002-PS by DI water, and place the diluted PS solution to the ultrasonic bath and ultrasonic process for 30 minutes. Gradually add TEOS (0.2 wt. % N002-PS:TEOS=5:2) while stirring the PS solution. Then, keep stirring for 24 hours to get a complete hydrolysis of TEOS. Dropwise add 10% $NH_3.H_2O$ till the formation of gel, and the gel can be called as TP gel. Grind the TP gel to tiny particles. Oven dries at 120° C. for 2 hours, at 150° C. for 4 hours. Mix the dried TP particles with Mg in a ratio of 10:7. Use 20 times amount of 7 mm SS balls and ball mill under Argon protection, gradually increase the rotating speed to 250 rpm. Put certain amount of TPM powders in Nickel crucible and heat treatment at 680° C. Prepare certain amount of 2M HCl solution. Then gradually add heat treated TPM powders to the acid solution. Keep the reaction for 2-24 hours, and then put the turbid liquid to the ultrasonic bath and ultrasonic process for 1 hour. Pour out the suspension to the filtration system. Discard the bottom large particles. Use DI water to rinse three times. Dry the yellow paste and blend the yellow paste to powders. The as-prepared nano particle has a SSA value range of 30 $m^2/g$ to 200 $m^2/g$ due to different ratio of graphene contents A certain amount of the dried TPM particles is then put into muffle furnace and calcined at 400° C.~600° C. for 2 hours under air purging to remove the carbon content from the nanocomposite, producing graphene-free yellow-color silicon nano powders. Both Si nano powder and graphene-wrapped Si nano particles were used as a high-capacity anode active material.

Example 14: Graphene-Enhanced Tin Oxide Particulates as an Anode Active Material Tin oxide ($SnO_2$) nano particles, an anode active material, were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added drop-wise under vigorous stirring to the tin chloride solution at a rate of 1 mL/min. This solution was homogenized by sonication for 5 min. Subsequently, the resulting hydrosol was reacted with the GO dispersion for 3 hours. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere.

Example 15: Preparation and Electrochemical Testing of Various Battery Cells

For most of the anode and cathode active materials investigated, we prepared alkali metal-sulfur cells or alkali metal ion-sulfur cells using both the presently invented method and the conventional method.

With the conventional method, a typical anode composition includes 85 wt. % active material (e.g., Sn- or $Na_2C_8H_4O_4$-coated graphene sheets for Na ion-sulfur anode; graphite or Si particles for Li ion-sulfur anode), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. Cathode layers are made in a similar manner (using Al foil as the cathode current collector). An anode layer, separator layer (e.g. Celgard 2400 membrane), and a cathode layer are then laminated together and housed in a plastic-Al envelop. The cell is then injected with 1 M $LiPF_6$ or $NaPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

In the presently invented process, in certain examples, the anode current collector (conductive porous structure for the anode), the separator, and the cathode current collector (conductive porous structure for the cathode side) are assembled in a protective housing before or after the injecting (or impregnation) of the first suspension and/or the injecting (or impregnation) of the second suspension. In some examples, we assembled an empty foamed anode current collector, a porous separator layer, and an empty foamed current collector together to form an assembly that was housed in a pouch (made of Al-nylon bi-layer film). The first suspension was then injected into the anode current collector and the second suspension was injected into the cathode current collector. The pouch was then sealed. In other examples, we impregnated a foamed anode current collector with the first suspension to form an anode layer and, separately, impregnated a foamed cathode current collector with the second suspension to form a cathode layer. The anode layer, a porous separator layer, and the cathode layer were then assembled and housed in a pouch to form a cell. With the instant method, typically no binder resin is needed or used, saving 8% weight (reduced amount of non-active materials).

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

It may be noted that, in lithium-ion battery industry, it is a common practice to define the cycle life of a battery as the number of charge-discharge cycles that the battery suffers 20% decay in capacity based on the initial capacity measured after the required electrochemical formation. The same definition for the cycle life of a Li—S or room temperature Na—S cell is herein followed.

Example 16: Representative Testing Results

Figure 5:
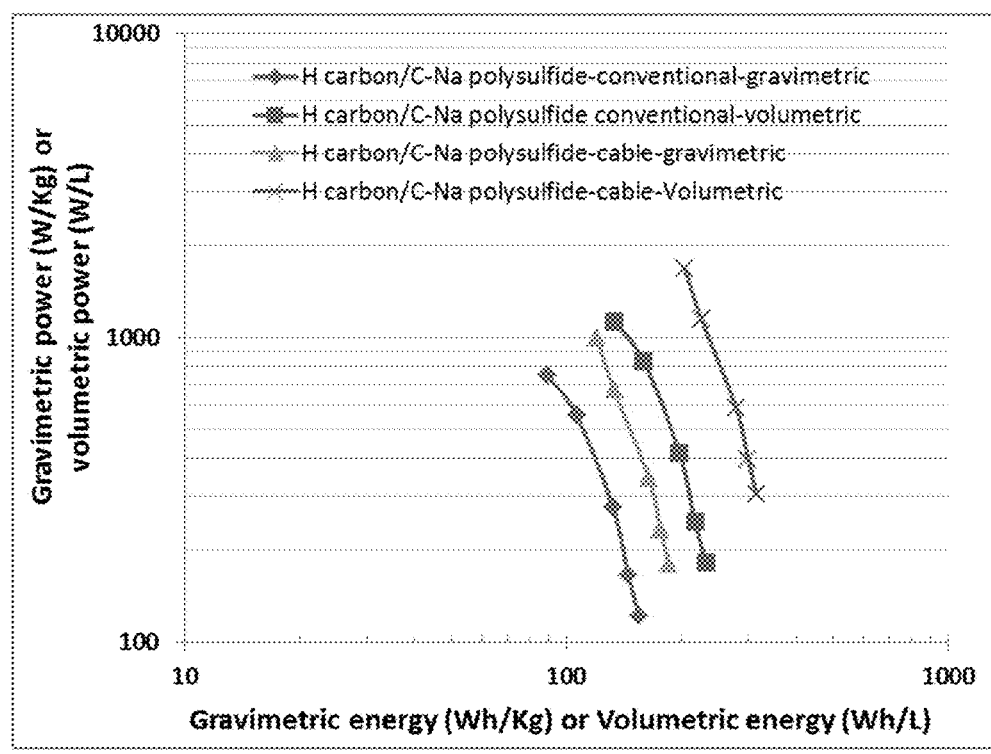
FIG. 5 Ragone plots (gravimetric and volumetric power density vs. energy density) of Na ion-sulfur battery cells containing hard carbon particles as the anode active material and sodium polysulfide particles as the cathode active materials (along with electrolyte) residing in pores of graphene foam. Two of the 4 data curves are for the cells prepared according to an embodiment of instant invention (cable-shape cells) and the other two by the conventional slurry coating of electrodes (roll-coating).

For each sample, several current densities (representing charge/discharge rates) were imposed to determine the electrochemical responses, allowing for calculations of energy density and power density values required of the construction of a Ragone plot (power density vs. energy density). Shown in FIG. 5 are Ragone plots (gravimetric and volumetric power density vs. energy density) of Na-ion battery cells containing hard carbon particles as the anode active material and activated carbon/sulfur composite particles as the cathode active materials. Two of the 4 data curves are for the cells prepared according to an embodiment of instant invention and the other two by the conventional slurry coating of electrodes (roll-coating of slurry). Several significant observations can be made from these data:

Both the gravimetric and volumetric energy densities and power densities of the room-temperature sodium ion-S battery cells prepared by the presently invented method (denoted as "cable" in the figure legend) are significantly higher than those of their counterparts prepared via the conventional roll-coating method (denoted as "conventional"). A change from an anode thickness of 150 µm (coated on a flat solid Cu foil) to a thickness of 225 µm (all accommodated in pores of a Ni foam having 85% porosity) and a corresponding change in the cathode to maintain a balanced capacity ratio results in a gravimetric energy density increase from 155 Wh/kg to 185 Wh/kg. Even more surprisingly, the volumetric energy density is increased from 232 Wh/L to 314 Wh/L.

These significant differences cannot be simply ascribed to the increases in the electrode thickness and the mass loading. The differences are likely due to the significantly higher active material mass loading (relative to other materials) associated with the presently invented cells, reduced proportion of overhead (non-active) components relative to the active material weight/volume, no need to have a binder resin, surprisingly better utilization of the electrode active material (most, if not all, of the hard carbon particles and C/S particles contributing to the sodium ion storage capacity; no dry pockets or ineffective spots in the electrode, particularly under high charge/discharge rate conditions), and the surprising ability of the inventive method to more effectively pack active material particles in the pores of the foamed current collector.

Figure 6:
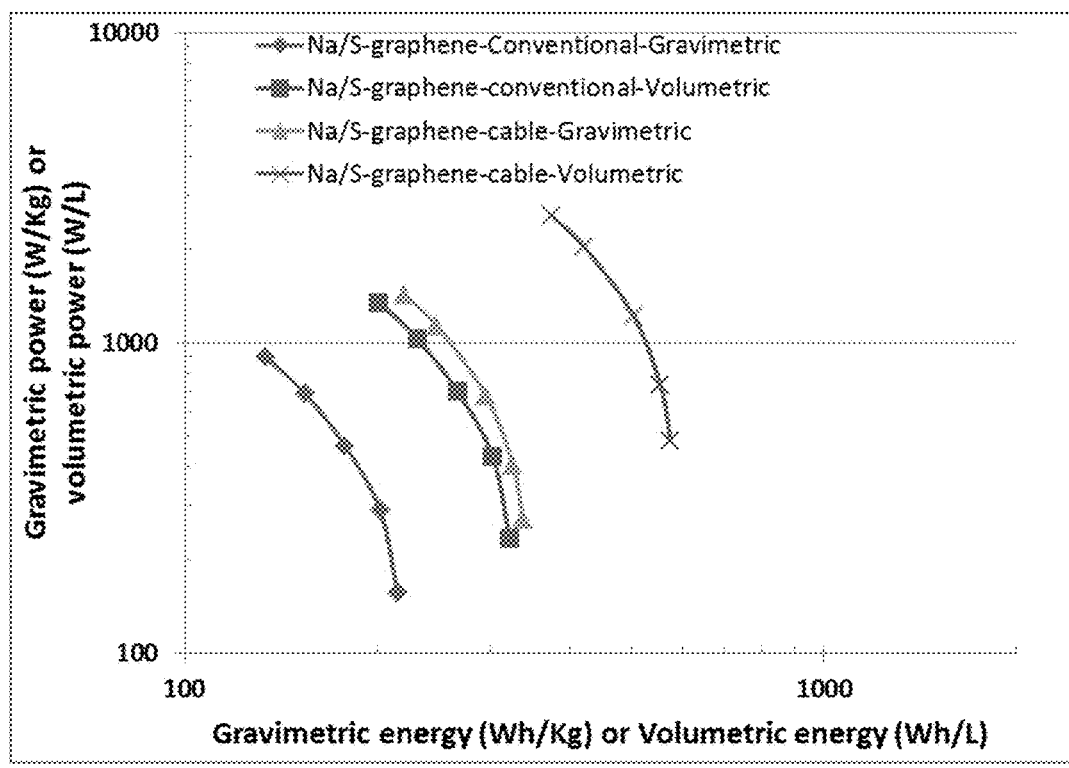
FIG. 6 Ragone plots (both gravimetric and volumetric power density vs. gravimetric and volumetric energy density) of two Na—S cells, both containing graphene-embraced Na nano particles as the anode active material and sulfur coated on graphene pore walls as the cathode active material. The data are for both sodium ion cells prepared by the presently invented method and those by the conventional slurry coating of electrodes.

FIG. 6 shows the Ragone plots (both gravimetric and volumetric power density vs. gravimetric and volumetric energy density) of two cells, both containing graphene-embraced Na nano particles as the anode active material and S impregnated in pores of graphene foam as the cathode active material. The experimental data were obtained from the battery cells that were prepared by the presently invented method into a cable configuration and those by the conventional slurry coating of electrodes.

These data indicate that both the gravimetric and volumetric energy densities and power densities of the battery cells prepared by the presently invented method are significantly higher than those of their counterparts prepared via the conventional method. The differences are huge. The conventionally made cells exhibit a gravimetric energy density of 215 Wh/kg and volumetric energy density of 323 Wh/L, but the presently invented cable-shaped cells deliver 338 Wh/kg and 575 Wh/L, respectively. The cell-level volumetric energy density of 575 Wh/L has never been previously achieved with any rechargeable sodium batteries. The power densities as high as 1434 W/kg and 2,580 W/L are also unprecedented for typically higher-energy lithium-ion batteries, let alone for sodium-ion batteries.

These energy density and power density differences are mainly due to the high active material mass loading (>25 mg/cm$^2$ in the anode and >30 mg/cm$^2$ in the cathode) associated with the presently invented cells, reduced proportion of overhead (non-active) components relative to the active material weight/volume, no need to have a binder resin, the ability of the inventive method to better utilize the active material particles (all particles being accessible to liquid electrolyte and fast ion and electron kinetics), and to more effectively pack active material particles in the pores of the foamed current collectors.

Figure 7:
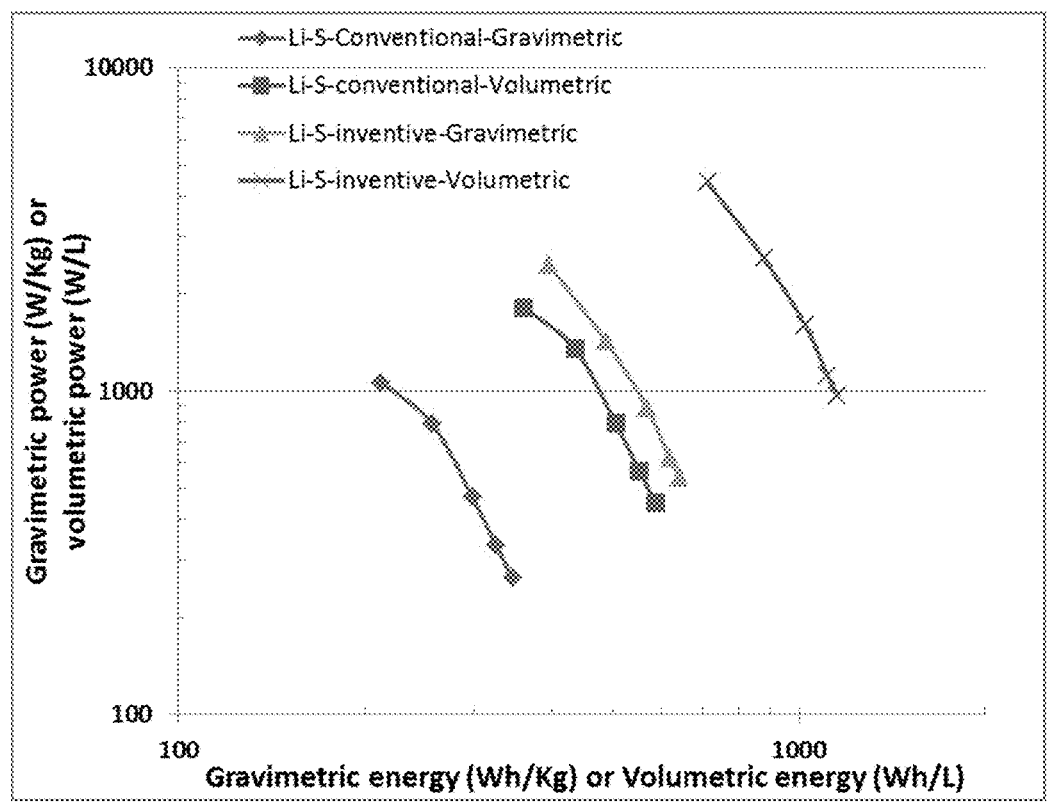
FIG. 7 Ragone plots of Li—S batteries containing a lithium foil as the anode active material, sulfur electrochemically deposited in pores of graphite foam as the cathode active material, and lithium salt ($LiPF_6$)-PC/DEC as organic liquid electrolyte. The data are for both lithium metal-sulfur cells prepared by the presently invented method and those by the conventional slurry coating of electrodes.

Shown in FIG. 7 are Ragone plots of Li—S batteries containing a lithium foil as the anode active material, S impregnated in graphite foam as the cathode active material, and lithium salt (LiaPF$_6$)-PC/DEC as organic liquid electrolyte. The data are for both lithium metal cells prepared by the presently invented method (cable-shaped cells) and those by the conventional slurry coating of electrodes. These data indicate that both the gravimetric and volumetric energy densities and power densities of the sodium metal cells prepared by the presently invented method are significantly higher than those of their counterparts prepared via the conventional method. Again, the differences are huge and are likely due to the significantly higher active material mass loading associated with the presently invented cells, reduced proportion of overhead (non-active) components relative to the active material weight/volume, no need to have a binder resin, surprisingly better utilization of the electrode active material (most, if not all, of the active material contributing to the lithium ion storage capacity; no dry pockets or ineffective spots in the electrode, particularly under high charge/discharge rate conditions), and the surprising ability of the inventive method to more effectively pack active material particles in the pores of the foamed current collector.

Quite noteworthy and unexpected is the observation that the cell-level gravimetric energy density of the presently invented Li—S cell is as high as 643 Wh/kg, higher than those of all rechargeable lithium metal or lithium-ion batteries ever reported (recall that current Li-ion batteries typically store 150-250 Wh/kg based on the total cell weight and 500-650 Wh/L per cell volume). Furthermore, for sulfur cathode active material-based lithium batteries, a volumetric energy density of 1,185 Wh/L, a gravimetric power density of 2,450 W/kg and volumetric power density of 4,423 W/L would have been un-thinkable.

It is of significance to point out that reporting the energy and power densities per weight of active material alone on a Ragone plot, as did by many researchers, may not give a realistic picture of the performance of the assembled battery cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In commercial lithium-ion batteries having an electrode thickness of 150 μm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. The corresponding weight fractions in Na-ion batteries are expected to be very similar since both the anode active materials and cathode active materials have similar physical densities between two types of batteries and the ratio of cathode specific capacity to the anode specific capacity is also similar. Hence, a factor of 3 to 4 may be used to extrapolate the energy or power densities of the device (cell) from the properties based on the active material weight alone. In most of the scientific papers, the properties reported are typically based on the active material weight alone and the electrodes are typically very thin (<<100 μm and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

Figure 8:
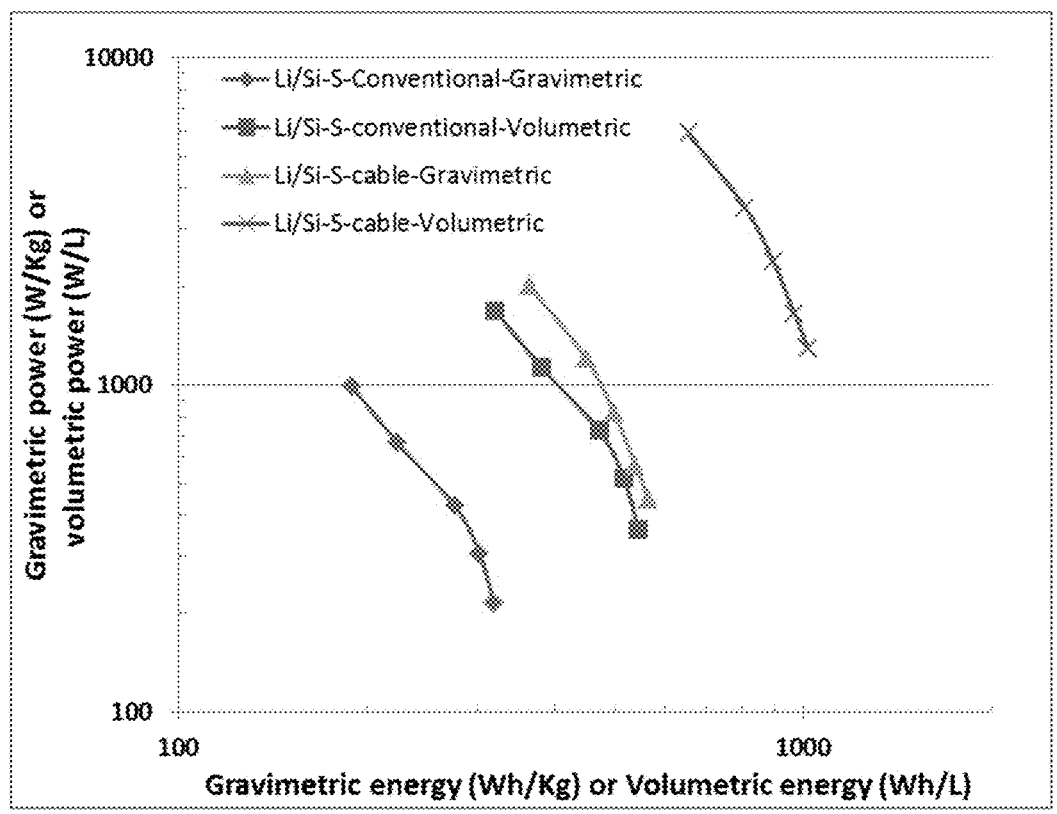
FIG. 8 Ragone plot of a series of Li ion-S cells (graphene-wrapped Si nano particles) prepared by the conventional slurry coating process and the Ragone plot of corresponding cells prepared by the presently invented process.

FIG. 8 shows the Ragone plot of a series of Li ion-S cells (graphene-wrapped Si nano particles, or pre-lithiated Si nano particles) prepared by the conventional slurry coating process and the Ragone plot of corresponding cells prepared by the presently invented process. These data again demonstrate the effectiveness of the presently invented process in imparting unexpectedly high energy densities, both gravimetric and volumetric, to the Li—S battery cells.

Example 17: Achievable Electrode Diameter or Thickness and its Effect on Electrochemical Performance of Lithium-Sulfur Battery Cells One might be tempted to think the electrode thickness of an alkali metal-sulfur battery is a design parameter that can be freely adjusted for optimization of device performance. Contrary to this perception, in reality, the electrode thickness of an alkali metal battery (including alkali metal-sulfur) is manufacturing-limited and one cannot produce electrodes of good structural integrity that exceed certain thickness level in a real industrial manufacturing environment (e.g. a roll-to-roll slurry coating facility). The conventional battery electrode design is based on coating an electrode layer on a flat metal current collector, which has several major problems: (a) A thick coating on Cu foil or Al foil requires a long drying time (requiring a heating zone 30-100 meters long). (b) Thick electrodes tend to get delaminated or cracked upon drying and subsequent handling, and even with a resin binder proportion as high as 15-20% to hopefully improve the electrode integrity this problem remains a major limiting factor. Thus, such an industry practice of roll-coating of slurry on a solid flat current collector does not allow for high active material mass loadings. (c) A thick electrode prepared by coating, drying, and compression makes it difficult for electrolyte (injected into a cell after the cell is made) to permeate through the electrode and, as such, a thick electrode would mean many dry pockets or spots that are not wetted by the electrolyte. This would imply a poor utilization of the active materials. The instant invention solves these long-standing, critically important issues associated with alkali metal batteries.

Figure 9:
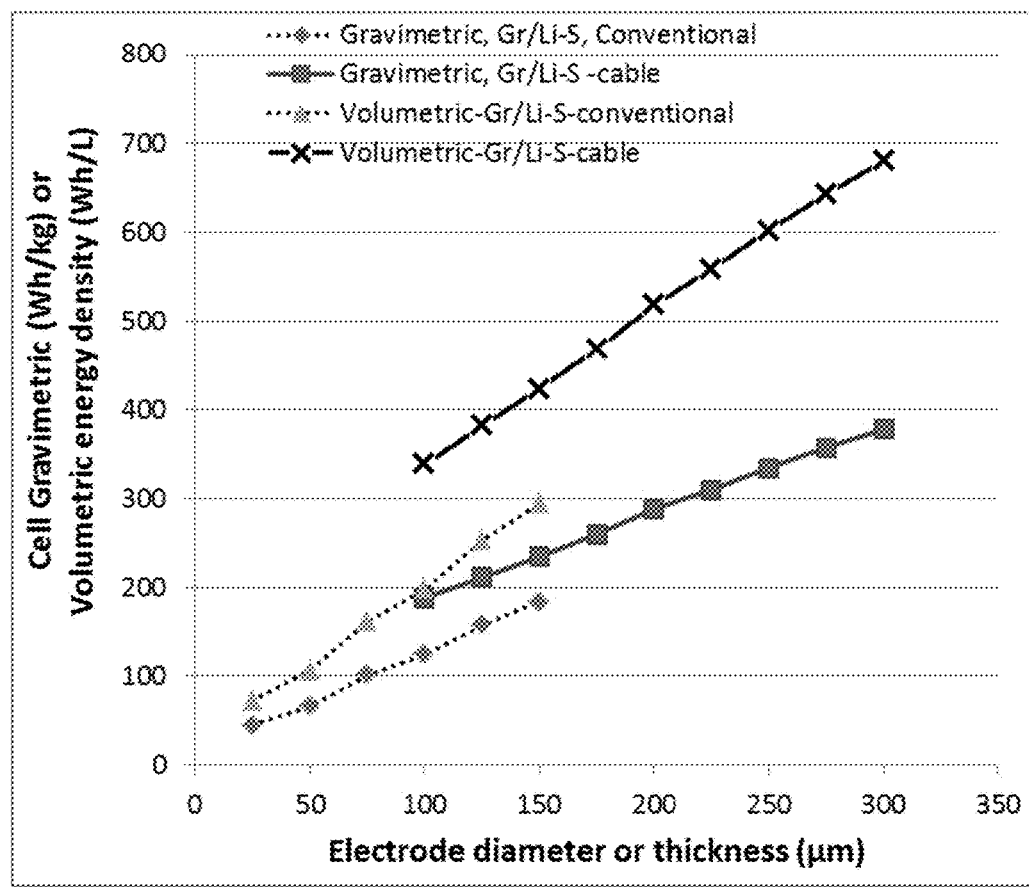
FIG. 9 The cell-level gravimetric (Wh/kg) and volumetric energy densities (Wh/L) of Li ion-S cell (Pre-lithiated graphite anode+graphene-supported S cathode) plotted over the achievable cathode thickness range of the S/RGO cathode prepared via the conventional method without delamination and cracking and those by the presently invented method.

Shown in FIG. 9 are the cell-level gravimetric (Wh/kg) and volumetric energy densities (Wh/L) of Li ion-S cells (Pre-lithiated graphite anode+RGO foam-supported S cathode) plotted over the achievable cathode thickness range of the S/RGO cathode prepared via the conventional method without delamination and cracking and those by the presently invented cable construction method.

The electrodes can be fabricated up to a thickness of 100-200 μm using the conventional slurry coating process. However, in contrast, there is no theoretical limit on the electrode thickness or diameter that can be achieved with the presently invented method. Typically, the practical electrode thickness is from 10 μm to 1000 μm, more typically from 100 μm to 800 μm, and most typically from 200 μm to 600 μm.

These data further confirm the surprising effectiveness of the presently invented method in producing ultra-thick lithium or sodium battery electrodes not previously achievable. These ultra-thick electrodes in sodium metal batteries lead to exceptionally high sulfur cathode active material mass loading, typically significantly >15 $mg/cm^2$ (more typically >20 $mg/cm^2$, further typically >30 $mg/cm^2$, often >40 $mg/cm^2$, and even >50 $mg/cm^2$). These high active material mass loadings have not been possible to obtain with conventional alkali metal-sulfur batteries made by the slurry coating processes. These high active material mass loadings led to exceptionally high gravimetric and volumetric energy densities that otherwise have not been previously achieved given the same battery system.

Dendrite issues commonly associated with Li and Na metal secondary cells are also resolved by using the presently invented foamed current collector strategy. Hundreds of cells have been investigated and those cells having a foamed anode current collector were not found to fail due to dendrite penetration through the separator. SEM examination of samples from presently invented sodium and potassium cells confirms that the re-deposited alkali metal surfaces on pore walls in a porous anode current collector appear to be smooth and uniform, exhibiting no sign of sharp metal deposit or tree-like features as often observed with corresponding cells having a solid current collector (Cu foil) at the anode. This might be due to a reduced exchange current density associated with a high specific surface area of the foamed current collector at the anode and a more uniform local electric field in such a foamed structure that drives the alkali metal deposition during repeated re-charge procedures.

We claim:

1. A cable-shaped alkali metal-sulfur battery wherein said alkali metal is selected from Li, Na, or a combination thereof said battery comprising:
    (a) a first electrode comprising an electrically conductive porous rod having at least 50% by volume of pores and a first mixture of a first electrode active material and a first electrolyte, wherein said first mixture resides in said pores of said porous rod;
    (b) a porous separator wrapping around said first electrode;
    (c) a second electrode comprising an electrically conductive porous layer wrapping around or encasing said porous separator, wherein said conductive porous layer contains at least 50% by volume of pores and a second mixture of a second electrode active material and a second electrolyte, and said second mixture resides in said pores of said porous layer; and
    (d) a protective casing or sheath wrapping around or encasing said second electrode;
wherein either the first electrode or the second electrode is a cathode and either the first electrode active material or the second electrode active material contains sulfur or a sulfur compound as a cathode active material and said battery has a cable shape having a length-to-diameter or length-to-thickness aspect ratio no less than 5.

2. The alkali metal-sulfur battery of claim 1, wherein said sulfur compound is selected from organo-sulfur, polymer-sulfur, carbon-sulfur, metal sulfide, S—Sb, S—Bi, S—Se, S—Te mixture, or a combination thereof.

3. The alkali metal-sulfur battery of claim 1, wherein said cathode active material contains a material selected from sulfur bonded to pore walls of said porous rod or porous layer, sulfur bonded to or confined by a carbon or graphite material, sulfur bonded to or confined by a polymer, sulfur-carbon compound, metal sulfide $M_xS_y$, wherein x is an integer from 1 to 3 and y is an integer from 1 to 10, and M is a metal element selected from Li, Na, K, Mg, Ca, a transition metal, a metal from groups 13 to 17 of the periodic table, or a combination thereof.

4. The alkali metal-sulfur battery of claim 1, wherein said first electrode is a negative electrode or anode and said second electrode is a positive electrode or cathode.

5. The alkali metal-sulfur battery of claim 1, wherein said second electrode is a negative electrode or anode and said first electrode is a positive electrode or cathode.

6. The alkali metal-sulfur battery of claim 1, wherein said cathode active material is supported by a functional material or nano-structured material selected from the group consisting of:
    i. a nano-structured or porous disordered carbon material selected from particles of a soft carbon, hard carbon, polymeric carbon or carbonized resin, meso-phase carbon, coke, carbonized pitch, carbon black, activated carbon, nano-cellular carbon foam or partially graphitized carbon;
    ii. a nano graphene platelet selected from a single-layer graphene sheet or multi-layer graphene platelet;
    iii. a carbon nanotube selected from a single-walled carbon nanotube or multi-walled carbon nanotube;
    iv. a carbon nano-fiber, nano-wire, metal oxide nano-wire or fiber, conductive polymer nano-fiber, or a combination thereof;
    v. a carbonyl-containing organic or polymeric molecule;
    vi. a functional material containing a carbonyl, carboxylic, or amine group to reversibly capture sulfur;
    and combinations thereof.

7. The alkali metal-sulfur battery of claim 1, wherein said cable-shaped battery has a first end and a second end and said first electrode contains a first terminal connector comprising at least one metallic wire, conductive carbon/graphite fiber, or conductive polymer fiber that is embedded in, connected to, or integral with said first electrode.

8. The alkali metal-sulfur battery of claim 7, wherein said at least one metallic wire, conductive carbon/graphite fiber, or conductive polymer fiber runs approximately from said first end to said second end.

9. The alkali metal-sulfur battery of claim 1, wherein said cable-shaped battery has a first end and a second end and said second electrode contains a second terminal connector comprising at least one metallic wire, conductive carbon/graphite fiber, or conductive polymer fiber that is embedded in, connected to, or integral with said second electrode.

10. The alkali metal-sulfur battery of claim 9, wherein said at least one metallic wire, conductive carbon/graphite fiber, or conductive polymer fiber runs approximately from said first end to said second end.

11. The alkali metal-sulfur battery of claim 1, wherein said electrically conductive porous rod in the first electrode or the electrically conductive porous layer in the second electrode contains a porous foam selected from a metal foam, metal web, metal fiber mat, metal nanowire mat, conductive polymer fiber mat, conductive polymer foam, conductive polymer-coated fiber foam, carbon foam, graphite foam, carbon aerogel, carbon xerogel, graphene aerogel, graphene foam, graphene oxide foam, reduced graphene oxide foam, carbon fiber foam, graphite fiber foam, exfoliated graphite foam, or a combination thereof.

12. The alkali metal-sulfur battery of claim 1, wherein said porous foam has a cross-section that is circular, elliptic, rectangular, square, hexagon, hollow, or irregular in shape.

13. The alkali metal-sulfur battery of claim 1, wherein said electrically conductive porous rod in the first electrode or the electrically conductive porous layer in the second electrode contains a conductive polymer fiber, a carbon/graphite fiber, a fiber tow, fiber yarn, fiber braid, fiber knit structure that is made of a conductive polymer, carbon, or graphite fiber and is porous.

14. The alkali metal-sulfur battery of claim 1, wherein said battery has a cable shape having a length and a diameter or thickness and a length/thickness or length/diameter aspect ratio greater than 10.

15. The alkali metal-sulfur battery of claim 1, wherein said battery has a cable shape having a length and a diameter or thickness and a length/thickness or length/diameter aspect ratio greater than 20.

16. The alkali metal-sulfur battery of claim 1, wherein said first electrode or second electrode contains particles, foil, or coating of Li, Na, or a combination thereof as an electrode active material.

17. The alkali metal-sulfur battery of claim 1, wherein said first or second electrode active material is an anode active material selected from the group consisting of:
  (a) particles of natural graphite, artificial graphite, mesocarbon microbeads (MCMB), and carbon;
  (b) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd);
  (c) alloys or intermetallic compounds of Si, Ge, Sn, Pb, Sb, Bi, Zn, Al, or Cd with other elements, wherein said alloys or compounds are stoichiometric or non-stoichiometric;
  (d) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites;
  (e) pre-lithiated or pre-sodiated versions thereof;
  (f) pre-lithiated or pre-sodiated graphene sheets;
and combinations thereof.

18. The alkali metal-sulfur battery of claim 17, wherein said pre-lithiated or pre-sodiated graphene sheets are selected from pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

19. The alkali metal-sulfur battery of claim 1, wherein one of said first or second electrode active material contains an alkali intercalation compound selected from petroleum coke, carbon black, amorphous carbon, activated carbon, hard carbon, soft carbon, templated carbon, hollow carbon nanowires, hollow carbon sphere, natural graphite, artificial graphite, lithium or sodium titanate, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

20. The alkali metal-sulfur battery of claim 1, wherein said first electrolyte and/or said second electrolyte contains a lithium salt or sodium salt dissolved in a liquid solvent and wherein said liquid solvent is water, an organic solvent, an ionic liquid, a mixture of an organic solvent and an ionic liquid, or a liquid solvent-polymer gel.

21. The alkali metal-sulfur battery of claim 19, wherein said aqueous electrolyte contains a sodium salt or a lithium salt dissolved in water or a mixture of water and alcohol.

22. The alkali metal-ion battery of claim 21, wherein said sodium salt or lithium salt is selected from $Na_2SO_4$, $Li_2SO_4$, a mixture thereof, NaOH, LiOH, NaCl, LiCl, NaF, LiF, NaBr, LiBr, NaI, LiI, or a mixture thereof.

23. The alkali metal-sulfur battery of claim 19, wherein said organic solvent is selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

24. The alkali metal-sulfur battery of claim 19, wherein said organic electrolyte contains an alkali metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF3(CF_2CF_3)_3$), lithium bisperfluoroethysulfonylimide (LiBETI), sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

25. The alkali metal-sulfur battery of claim 19, wherein said ionic liquid electrolyte contains an ionic liquid solvent selected from a room temperature ionic liquid having a cation selected from tetra-alkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

26. The alkali metal-sulfur battery of claim 25, wherein said ionic liquid solvent is selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

27. The alkali metal-sulfur battery of claim 1, wherein said first electrolyte and/or said second electrolyte contains a lithium salt or sodium salt dissolved in a liquid solvent having a salt concentration greater than 2.5 M, a salt concentration greater than 5.0 M, or a salt concentration greater than 7.0 M.

28. The alkali metal-sulfur battery of claim 1, wherein said electrically conductive porous rod in the first electrode or the electrically conductive porous layer in the second electrode has at least 85% by volume of pores, the first or second electrode has an active mass loading occupying at least 25% by weight or by volume of the entire battery cell, or the first and second electrode active materials combined occupies at least 40% by weight or by volume of the entire battery cell.

29. The alkali metal-sulfur battery of claim 1, wherein said electrically conductive porous rod in the first electrode or the electrically conductive porous layer in the second electrode has at least 90% by volume of pores, the first or second electrode has an active mass loading occupying at least 30% by weight or by volume of the entire battery cell, or the first and second electrode active materials combined occupies at least 50% by weight or by volume of the entire battery cell.

30. The alkali metal-sulfur battery of claim 1, wherein said electrically conductive porous rod in the first electrode or the electrically conductive porous layer in the second electrode has at least 95% by volume of pores, the first or second electrode has an active mass loading occupying at least 35% by weight or by volume of the entire battery cell, or the first and second electrode active materials combined occupies at least 60% by weight or by volume of the entire battery cell.

31. The alkali metal battery of claim 1, wherein the length of said battery is greater than 1 m.

32. The alkali metal battery of claim 1, wherein said battery is bent having a radius of curvature greater than 10 cm.

33. The alkali metal battery of claim 1, wherein said battery is bendable to substantially conform to a shape of a void or interior compartment in a vehicle, said void or interior compartment comprising trunk, door, hatch, spare tire compartment, area under seat, roof, or area under dashboard.

34. The alkali metal battery of claim 33, wherein said battery is removable from a vehicle and is bendable to conform to the shape of a different void or interior compartment.

35. The alkali metal battery of claim 1, wherein one or more units of said battery are incorporated into a garment, belt, carrying strap, luggage strap, weaponry strap, musical instrument strap, helmet, hat, boot, foot covering, glove, wrist covering, watch band, jewelry item, animal collar or animal harness.

36. The alkali metal battery of claim 1, wherein one or more units of said battery are removably incorporated in a garment, belt, carrying strap, luggage strap, weaponry strap, musical instrument strap, helmet, hat, boot, foot covering, glove, wrist covering, watch band, jewelry item, animal collar or animal harness.

37. The alkali metal battery of claim 1, wherein said battery conforms to the interior radius of a hollow bicycle frame.

38. A cable-shaped alkali metal-sulfur battery wherein said alkali metal is selected from Li, Na, or a combination thereof; said battery comprising:
 (a) a first electrode comprising an electrically conductive rod and a first mixture of a first electrode active material and an optional first electrolyte coated on a surface of said conductive rod;
 (b) a porous separator wrapping around said first electrode;
 (c) a second electrode comprising an electrically conductive porous layer wrapping around or encasing said porous separator, wherein said conductive porous layer contains at least 50% by volume of pores and a second mixture of a second electrode active material and a second electrolyte, and said second mixture resides in said pores of said porous layer; and
 (d) a protective casing or sheath wrapping around or encasing said second electrode;
 (e) wherein either the first electrode or the second electrode is a cathode and either the first electrode active material or the second electrode active material is a cathode active material selected from sulfur bonded to pore walls of said porous rod or porous layer, sulfur bonded to or confined by a carbon or graphite material, sulfur bonded to or confined by a polymer, sulfur-carbon compound, metal sulfide $M_xS_y$, wherein x is an integer from 1 to 3 and y is an integer from 1 to 10, and M is a metal element selected from Li, Na, K, Mg, Ca, a transition metal, a metal from groups 13 to 17 of the periodic table, or a combination thereof and said battery has a cable shape having a length-to-diameter or length-to-thickness aspect ratio no less than 5.

39. A cable-shaped alkali metal-sulfur battery wherein said alkali metal is selected from Li, Na, or a combination thereof; said battery comprising:
 (a) a first electrode comprising an electrically conductive porous rod having at least 50% by volume of pores and a first mixture of a first electrode active material and a first electrolyte wherein said first mixture resides in said pores of said porous rod;
 (b) a porous separator wrapping around said first electrode;
 (c) a second electrode comprising an electrically conductive layer wrapping around or encasing said porous separator, wherein said conductive layer contains a second mixture of a second electrode active material and an optional second electrolyte deposited thereon or therein; and
 (d) a protective casing or sheath wrapping around or encasing said second electrode;
 (e) wherein either the first electrode or the second electrode is a cathode and either the first electrode active material or the second electrode active material is a cathode active material selected from sulfur or a sulfur compound is selected from organo-sulfur, polymer-sulfur, carbon-sulfur, metal sulfide, S—Sb, S—Bi, S—Se, S—Te mixture, or a combination thereof and said battery has a cable shape having a length-to-diameter or length-to-thickness aspect ratio no less than 5.

* * * * *

UNITED STATES PATENT AND TRADEMARK OFFICE
CERTIFICATE OF CORRECTION

PATENT NO. : 10,158,121 B2
APPLICATION NO. : 15/391368
DATED : December 18, 2018
INVENTOR(S) : Aruna Zhamu et al.

It is certified that error appears in the above-identified patent and that said Letters Patent is hereby corrected as shown below:

In the Claims

Column 43, Line 51, Claim 21, Line 1 should read:
"The alkali metal-sulfur battery of claim 20, wherein"

Column 43, Line 58, Claim 23, Line 1 should read:
"The alkali metal-sulfur battery of claim 20, wherein"

Column 44, Line 6, Claim 24, Line 1 should read:
"The alkali metal-sulfur battery of claim 20, wherein"

Column 44, Line 27, Claim 25, Line 1 should read:
"The alkali metal-sulfur battery of claim 20, wherein"

Signed and Sealed this
Twenty-ninth Day of January, 2019

Andrei Iancu
*Director of the United States Patent and Trademark Office*